(12) United States Patent
Meijer et al.

(10) Patent No.: US 10,277,948 B2
(45) Date of Patent: Apr. 30, 2019

(54) REMOTE PARENTAL CONTROL WITH REWARD UNLOCK

(71) Applicant: DISH UKRAINE L.L.C., Kharkov (UA)

(72) Inventors: Johannes Meijer, Coevorden (NL); Nikolay Oleschuk, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

(21) Appl. No.: 14/893,812

(22) PCT Filed: May 27, 2013

(86) PCT No.: PCT/UA2013/000053
§ 371 (c)(1),
(2) Date: Nov. 24, 2015

(87) PCT Pub. No.: WO2014/193330
PCT Pub. Date: Dec. 4, 2014

(65) Prior Publication Data
US 2016/0112763 A1  Apr. 21, 2016

(51) Int. Cl.
*H04N 21/475* (2011.01)
*H04N 21/454* (2011.01)
(Continued)

(52) U.S. Cl.
CPC ..... *H04N 21/4751* (2013.01); *H04N 21/4227* (2013.01); *H04N 21/4312* (2013.01); *H04N 21/4332* (2013.01); *H04N 21/4532* (2013.01); *H04N 21/4542* (2013.01); *H04N 21/4753* (2013.01); *H04N 21/4755* (2013.01); *H04N 21/4758* (2013.01); *H04N 21/6547* (2013.01); *H04N 21/254* (2013.01); *H04N 21/25891* (2013.01); *H04N 21/42684* (2013.01); *H04N 21/658* (2013.01)

(58) Field of Classification Search
CPC ............... H04N 21/441; H04N 21/475; H04N 21/44753; H04N 21/4751; H04N 21/4758
See application file for complete search history.

(56) References Cited

U.S. PATENT DOCUMENTS 7,707,601 B2  4/2010  Runne
8,079,044 B1*  12/2011  Craner ............... H04N 21/4532
                                                        725/28

(Continued)

FOREIGN PATENT DOCUMENTS

| WO | 2009/018189 A1 | 2/2009 |
| WO | 2014/193330 A1 | 12/2014 |
| WO | 2014/193331 A1 | 12/2014 |

OTHER PUBLICATIONS

International Search Report and Written Opinion of PCT/UA2013/000054 dated Feb. 7, 2014, 9 pages.

(Continued)

*Primary Examiner* — Fernando Alcon
(74) *Attorney, Agent, or Firm* — Kilpatrick Townsend & Stockton LLP

(57) ABSTRACT

Authorized access to broadcast programming may be gained upon correct or at least sufficient answering of a particular question. The question may prompt a user to correctly solve a problem. The question may prompt a user to confirm completion of a particular task.

20 Claims, 11 Drawing Sheets

(51) Int. Cl.
*H04N 21/4227* (2011.01)
*H04N 21/45* (2011.01)
*H04N 21/431* (2011.01)
*H04N 21/433* (2011.01)
*H04N 21/6547* (2011.01)
*H04N 21/254* (2011.01)
*H04N 21/258* (2011.01)
*H04N 21/426* (2011.01)
*H04N 21/658* (2011.01)

(56) References Cited

U.S. PATENT DOCUMENTS

| | | | |
|---|---|---|---|
| 8,190,754 | B2 | 5/2012 | Strickland |
| 8,229,888 | B1 | 7/2012 | Roskind et al. |
| 8,706,349 | B2 | 4/2014 | Rector et al. |
| 8,929,857 | B2 | 1/2015 | Baker et al. |
| 9,942,336 | B2 * | 4/2018 | Bostick .......... H04W 4/21 |
| 2003/0103627 | A1 | 6/2003 | Nierzwick et al. |
| 2003/0163811 | A1 | 8/2003 | Luehrs |
| 2003/0233436 | A1 | 12/2003 | Slemmer et al. |
| 2005/0028191 | A1 | 2/2005 | Sullivan et al. |
| 2005/0138193 | A1 * | 6/2005 | Encarnacion ....... H04L 12/2803 709/230 |
| 2005/0228881 | A1 | 10/2005 | Reasor et al. |
| 2005/0251827 | A1 | 11/2005 | Ellis et al. |
| 2007/0157260 | A1 | 7/2007 | Walker |
| 2007/0245398 | A1 | 10/2007 | Roden |
| 2008/0059409 | A1 | 3/2008 | Montpetit |
| 2008/0148310 | A1 * | 6/2008 | Strickland ......... G06F 17/30867 725/30 |
| 2009/0113472 | A1 * | 4/2009 | Sheth .......... G06F 17/3089 725/34 |
| 2009/0165033 | A1 * | 6/2009 | Clancy .......... H04N 7/17318 725/25 |
| 2010/0115592 | A1 | 5/2010 | Belz et al. |
| 2010/0333128 | A1 | 12/2010 | Smith et al. |
| 2011/0095914 | A1 * | 4/2011 | Velado ............ B63J 99/00 340/984 |
| 2011/0137520 | A1 | 6/2011 | Rector et al. |
| 2011/0185437 | A1 * | 7/2011 | Tran ............ H04L 63/104 726/28 |
| 2012/0215328 | A1 | 8/2012 | Schmelzer |
| 2012/0278899 | A1 | 11/2012 | Mahan |
| 2012/0324504 | A1 | 12/2012 | Archer et al. |
| 2013/0065555 | A1 | 3/2013 | Baker et al. |
| 2013/0212615 | A1 | 8/2013 | Schultz |
| 2014/0272894 | A1 * | 9/2014 | Grimes ............ G09B 5/08 434/350 |
| 2014/0304729 | A1 * | 10/2014 | Baum .......... H04N 21/812 725/32 |
| 2015/0306497 | A1 * | 10/2015 | Sampson .......... H04N 21/4333 463/42 |
| 2016/0142776 | A1 | 5/2016 | Meijer |

OTHER PUBLICATIONS

International Search Report of PCT/UA2013/000053 dated Feb. 17, 2014, 4 pages.

U.S. Appl. No. 14/893,787, filed Nov. 24, 2015, Non-Final Rejection dated Dec. 30, 2016, all pages.

International Preliminary Report on Patentability for PCT/UA2013/000054 dated Dec. 1, 2015, 6 pages.

International Preliminary Report on Patentability for PCT/UA2013/000053 dated Dec. 1, 2015, 7 pages.

U.S. Appl. No. 14/893,787, filed Nov. 24, 2015, Non-Final Rejection dated Aug. 14, 2017, all pages.

U.S. Appl. No. 14/893,787, Final Rejection dated Sep. 21, 2018, 11 pages.

\* cited by examiner

REMOTE PARENTAL CONTROL WITH REWARD UNLOCK

BACKGROUND

The ever-increasing amount and diversity of electronic media content may allow consumers the flexibility to access various content of interest. It may be difficult, however, for adult consumers to control and manage what type of content is accessed by minors under their charge.

SUMMARY

This Summary does not in any way limit the scope of the claimed subject matter.

In an aspect, a computer-implemented method is disclosed. The method may include receiving, at a television receiver from a computing system other than the television receiver, an instruction for the television receiver to prevent unauthorized access to particular broadcast programming according to a particular mode. The method may include receiving by the television receiver a request to access the particular broadcast programming. The method may include outputting, by the television receiver for presentation by a display device, a particular user interface selected from a number of different user interfaces based on the particular mode, wherein the particular user interface provides at least two options for user selection only one when selected provides an instruction for the television receiver to enable authorized access to the particular broadcast programming.

In an aspect, a television receiver is disclosed. The television receiver may include one or more processors and a memory communicatively coupled with and readable by the one or more processors. The memory may have stored therein processor-readable instructions which, when executed by the one or more processors, cause the one or more processors to detect receipt of an instruction for the television receiver to prevent unauthorized access to particular broadcast programming according to a particular mode. The memory may have stored therein processor-readable instructions which, when executed by the one or more processors, cause the one or more processors to detect receipt of a request to access the particular broadcast programming. The memory may have stored therein processor-readable instructions which, when executed by the one or more processors, cause the one or more processors to output for presentation by a display device a particular user interface selected from a number of different user interfaces based on the particular mode, wherein the particular user interface provides at least two options for user selection only one when selected provides an instruction for the television receiver to enable authorized access to the particular broadcast programming.

In an aspect, a non-transitory processor-readable medium is disclosed. The non-transitory processor-readable medium may comprise processor-readable instructions configured to cause one or more processors to detect receipt of an instruction to prevent unauthorized access to particular broadcast programming according to a particular mode. The non-transitory processor-readable medium may comprise processor-readable instructions configured to cause one or more processors to detect receipt of a request to access the particular broadcast programming. The non-transitory processor-readable medium may comprise processor-readable instructions configured to cause one or more processors to output for presentation by a display device a particular user interface selected from a number of different user interfaces based on the particular mode, wherein the particular user interface provides at least two options for user selection only one when selected provides an instruction to enable authorized access to the particular broadcast programming.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

The present disclosure is directed to or towards a parental control that prevents unauthorized access to particular media content, such as broadcast programming for example.

In a first example, referred to throughout as "Remote Parental Control with Reward Unlock," authorized access to broadcast programming may be gained upon correct or at least sufficient answering of a particular question. In one example embodiment, the question may prompt a user to correctly solve a problem, such as a mathematical problem for example. In another example embodiment, the question may prompt a user to confirm completion of a particular task, such as a household chore for example. Other embodiments are possible.

In another example, referred to throughout as "Network-Wide Remote Parental Control," a master or administrative device may be used to control and/or manage a particular media content lock on other devices within a particular network, such as a local area network for example. When a new device is registered, the new device is set-up to be configured so as to comply with the particular media content lock.

Although not so limited, an appreciation of the various aspects of the present disclosure may be gained from the following discussion in connection with the drawings.

Figure 1:
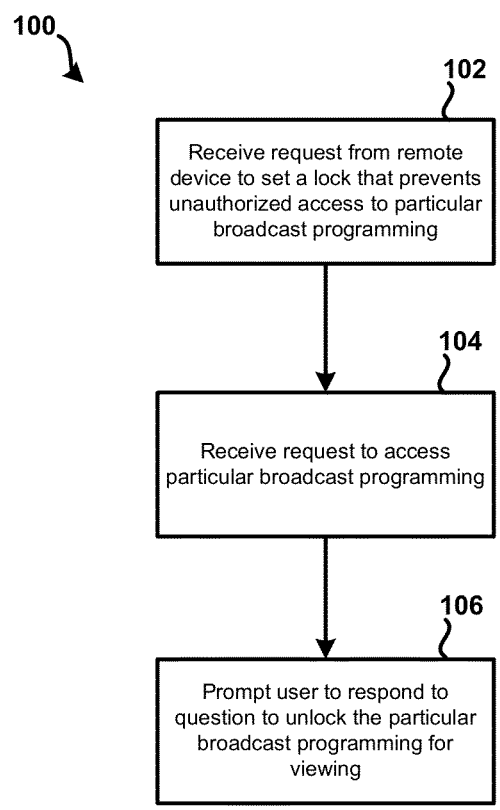
FIG. 1 shows a first example method in accordance with the present disclosure.

Referring now to FIG. 1, a first example method 100 is shown in accordance with the present disclosure. In particular, the example method 100 may correspond to a high-level description of the "Remote Parental Control with Reward Unlock" concept of the present disclosure. In general, the example method 100 as described may be performed on or by at least one computing system or device in a networked computing environment. An example of such a computing system or device may include a television receiver and/or a server computer(s), such as discussed below in connection with at least FIG. 3. An example of such a networked computing environment may include a content distribution system incorporating various aspects of a local area network and a satellite-based content distribution network, such as discussed below in connection with at least FIG. 3. Other embodiments are possible.

The method 100 may include receiving (module 102), by a computing system or device, a request from a device remote from the television receiver to set a "lock" to prevent unauthorized access to particular broadcast programming. For instance, in a parental control or parental controls scenario, a parent while commuting home from work in the afternoon may use their smartphone to remotely access a server, or a television receiver, to configure the television receiver such that their child when home from school in the afternoon cannot immediately turn on the television and start watching a show. Here, the device is "remote" because the request to set the lock is sent from the device to the television receiver over a network, such as the Internet for example. This is different than interacting with a particular computing device to set a parental control to limit access to certain features of that particular computing device. For example, this is different than installing a piece of software to a particular computing device, in which that piece of software control or limits access to one or more resources of that particular computing device. Although, such an implementation is not outside of the scope of the present disclosure.

Additionally, and as described in further detail below, the lock itself may be defined according to a particular scheme, to provide for a "granularity" in preventing unauthorized access to particular broadcast programming. For instance, it is contemplated that a "content-specific" parental control lock may prevent unauthorized viewing of a particular show, such as an instance of the show "South Park" for example. It is further contemplated that a "channel-specific" parental control lock may prevent unauthorized viewing of any program associated with a particular broadcast or network channel, such as all shows associated with the channel "MTV" for example. It is further contemplated that a "global" parental control lock may prevent unauthorized viewing of all broadcast programming received by the television receiver at any particular time when the global lock is "enabled." Many other types of "locks" are possible, where a "type" of a particular lock may or may not be implementation specific.

The method 100 may further include receiving (module 104), by the computing system or device, a request to access the particular broadcast programming; however, a lock is in place to prevent unauthorized access to the particular broadcast programming (see module 102). For instance, continuing with the above-example parental control scenario, the child may attempt to turn on the television and start watching a show immediately upon returning home from school in the afternoon. For example, the child may use a remote control device to try and select the show "South Park" from within an EPG (Electronic Programming Guide) for immediate viewing. In this example, it is assumed that the lock that is set in place (see module 102) is a lock defined so as to prevent unauthorized access to any instance of the show "South Park." In one embodiment, the television receiver may detect the selection of the show "South Park" within the EPG and equate that selection as a request to access the particular programming as discussed in the context of FIG. 1. Other embodiments are possible.

The method 100 may further include outputting (module 106), by the computing system or device for presentation by a display device, a user interface that requests a response to a question that when answered correctly removes the lock or "unlocks" the lock that is set to prevent unauthorized access to the particular broadcast programming (see module 102). For instance, continuing still with the above-example parental control scenario, in response to detecting or receiving the request to access the show "South Park" (see module 104), the television receiver may output a user interface for display by the television that states the question: "Did you do the dishes?" In this example, the user interface may provide a pair of user-selectable icons "Yes" and "No" so that the child may respond to the question. In another example, the television receiver may output a user interface for display by the television that states the question: "What is the result of 8 multiplied by 8?" In this example, the user interface may provide a number of user-selectable icons including an icon associated with the number "56," an icon associated with the number "64," and an icon associated with the number "72," so that the child may respond to the question.

In both of these examples, the child is afforded an opportunity to respond and select an answer that is "correct" or at least "sufficiently correct." An example of a "sufficiently correct" answer may include responding "Yes" to the question "Did you do the dishes?" This answer may be considered "sufficiently correct" because, while "Yes" is probably the desired answer (e.g., the parent wants to make sure the child cleaned the dirty dishes before watching a television show), there appears to be no "right" or "wrong" answer to the question. This consideration may be addressed for example when a "picture" is uploaded to a server that would allow the parent to "see" that the dishes are substantially cleaned so that the parent is satisfied, which may allow the parent to unlock content. In contrast, an example of a "correct" answer may be viewed as selecting the icon associated with the number "64" in response to the question "What is the result of 8 multiplied by 8?" This answer may be considered "correct" because it may be understood that there is a "right" and a "wrong" answer to that particular question.

Such an implementation as discussed in connection with FIG. 1 may be beneficial and/or advantageous in many respects. For example, in a parental control scenario, a minor may obtain a privilege as a reward for engaging in a productive and/or educational task. This may in one aspect be viewed as "nurturing" of the minor, whereby an adult may at least attempt to instill within the minor the importance of being active both in body and mind, as well as the concept of delayed gratification where, while perhaps not immediately appreciated, the child may enjoy a larger and possibly more significant future reward. Other advantages and/or benefits are possible. For example, such an implementation may increase the amount of interaction between a parent and a child. Still other advantages and/or benefits are possible. For example, a parent may stimulate their child to think about activities where they can help in house and/or to educate themselves and reward them sequentially. This may create a sense of responsibility and/or discipline. This may also create a sense of "nothing comes for free."

Figure 2:
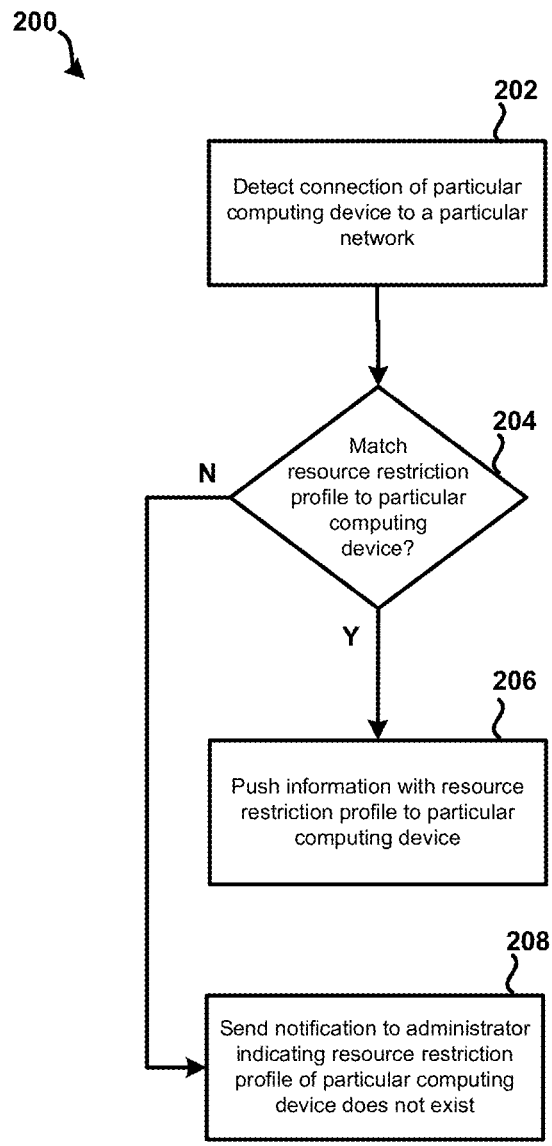
FIG. 2 shows a second example method in accordance with the present disclosure.

Referring now to FIG. 2, a second example method 200 is shown in accordance with the present disclosure. In particular, the example method 200 may correspond to a high-level description of the "Network-Wide Remote Parental Control" concept of the present disclosure. In general, the example method 200 as described may be performed on or by at least one computing system or device in a networked computing environment. An example of such a computing system or device may include a television receiver and/or a server computer(s), such as discussed below in connection with at least FIG. 3. An example of such a networked computing environment may include a content distribution system incorporating various aspects of a local area network and a satellite-based content distribution network, such as discussed below in connection with at least FIG. 3. Other embodiments are possible.

The method 200 may include detecting (module 202), by a computing system or device, connection of a particular computing device to a particular network. For instance, the computing system or device may as part of a discovery process detect connection of a smartphone to a particular local area network, such as a home area network, for example. In this example, upon detecting connection of the smartphone to the local area network, the computing system or device may determine whether or not a particular file or profile that is associated with the smartphone is available. Here, it is assumed that if or when a particular file or profile that is associated with the smartphone is available, then that smartphone is registered with the computing system or device to participate in a "Network-Wide Remote Parental Control" implementation according to the present disclosure. Likewise, it is assumed that if a particular file or profile that is associated with the smartphone is not available or unavailable, then that smartphone is not registered with the computing system or device to participate in a "Network-Wide Remote Parental Control" implementation according to the present disclosure.

The method 200 may include determining (module 204), by the computing system or device, whether or not a particular file or profile, referred to in one embodiment as a "resource restriction profile," that is associated with the particular computing device detected as connecting or connected to the particular network (see module 202) is available. For instance, the computing system or device may query a repository or database to determine whether the smartphone of the above-example scenario is registered with the computing system or device to participate in a "Network-Wide Remote Parental Control" implementation according to the present disclosure. Such a feature or process may be implemented in any number of ways.

For example, the smartphone itself may have a unique identification parameter that may be discovered by the computing system or device when the smartphone connects to the local area network. A particular resource restriction profile when existing may then be matched to the smartphone based on the unique identification parameter. In another example, a user credential such as a username and/or password, for example, that is used by a user to access features and/or functionality of the smartphone may be discovered by the computing system or device when the smartphone connects to the local area network. A particular resource restriction profile when existing may then be matched to the smartphone based on the user credential. Many other methods may be used to determine whether or not a particular file or profile that is associated with the particular computing device detected as connecting to the network is available.

The method 200 may include sending (module 206), by the computing system or device, information associated with a particular file or profile to the particular computing device when available (see module 204). For instance, the computing system or device may send to the smartphone of the above-example an associated particular resource restriction profile, or at least data contained within the associated particular resource restriction profile, where the particular resource restriction profile may in some cases designate at least one resource to be disabled by the smartphone when that resource is exhibited by the smartphone.

In the context of a parental control or a parental control scenario, the particular resource may be a resource that a parent wishes a child not have immediate access to, for whatever reason. Here, the smartphone may have a dedicated interface and/or software module configured to identify the particular resource that a parent wishes a child not have immediate access to, and disable and/or at least prevent or limit immediate access to the particular resource. It is contemplated that the dedicated interface and/or software module may be configured such that the same has access to resources of the smartphone both on a hardware level and software level in or at any degree of abstraction as desired. For example, the dedicated interface and/or software module may interact directly with an operating system of the smartphone. In another example, the dedicated interface and/or software module may sit above the operating system and interact directly with an executing mobile application. Still other examples are possible as well Further, the particular resource may be any type of hardware or software resource of the smartphone. For example, the particular resource may be a communications resource (e.g., texting, email, phone, etc.) that a parent wishes a child not have immediate access to. In another example, the particular resource may be a software or mobile application resource (e.g., Angry Birds, Internet browser, iTunes, etc.) that a parent wishes a child not have immediate access to. In still another example, the particular resource may be a specific social media resource (e.g., Facebook, Twitter, Snapchat, etc.) that a parent wishes a child not have immediate access to. Still other examples are possible.

The method 200 may include sending (module 208), by the computing system or device to an administrative device, a notification indicating that a particular file or profile that is associated with the particular computing device detected as connecting or connected to the particular network is not available (see module 204). An administrator may use the notification then to proceed with registering the particular computing device with the computing system or device to participate in a "Network-Wide Remote Parental Control" implementation according to the present disclosure. For instance, the notification may inform a parent that the smartphone of the above-example scenario, which may be assumed to be used or owned by a child in this example, has not yet been is registered with the computing system or device to participate in a "Network-Wide Remote Parental Control" implementation according to the present disclosure. As described in further detail below, the parent may then proceed to define a particular file or profile that is associated with the smartphone accordingly.

Such an implementation as discussed in connection with FIG. 2 may be beneficial and/or advantageous in many respects. For example, in a parental control scenario, many typical media content lock mechanisms may work only with a particular device, such as a Set-Top-Box, tablet computer, etc. However, with features and/or aspects of the "Network-Wide Remote Parental Control" of the present disclosure, all devices (e.g., respective resources of all devices) in a given network may be "locked," and access may only be allowed or permitted when "parental control" allows it. For example, when broadcast programming associated with the show "South Park" is blocked from being output by a television receiver, another "lock" may be put in place or defined such that when a child or minor finds the same content by other means, such as on "YouTube" using a smartphone for example, content associated with the show "South Park" that may be typically accessed via "YouTube" may be blocked as well. Other advantages and/or benefits are possible as well. For example, network wide remote parental control may allow centralization of the setup, and may prevent children to take alternative source to watch or play parental guided programming or games. Still other advantages and/or benefits are possible as well.

Further benefits and/or advantages associated with the "Remote Parental Control with Reward Unlock" and "Network-Wide Remote Parental Control" concepts of the present disclosure may be understood in light of the following description with reference to FIGS. 3-11.

Figure 3:
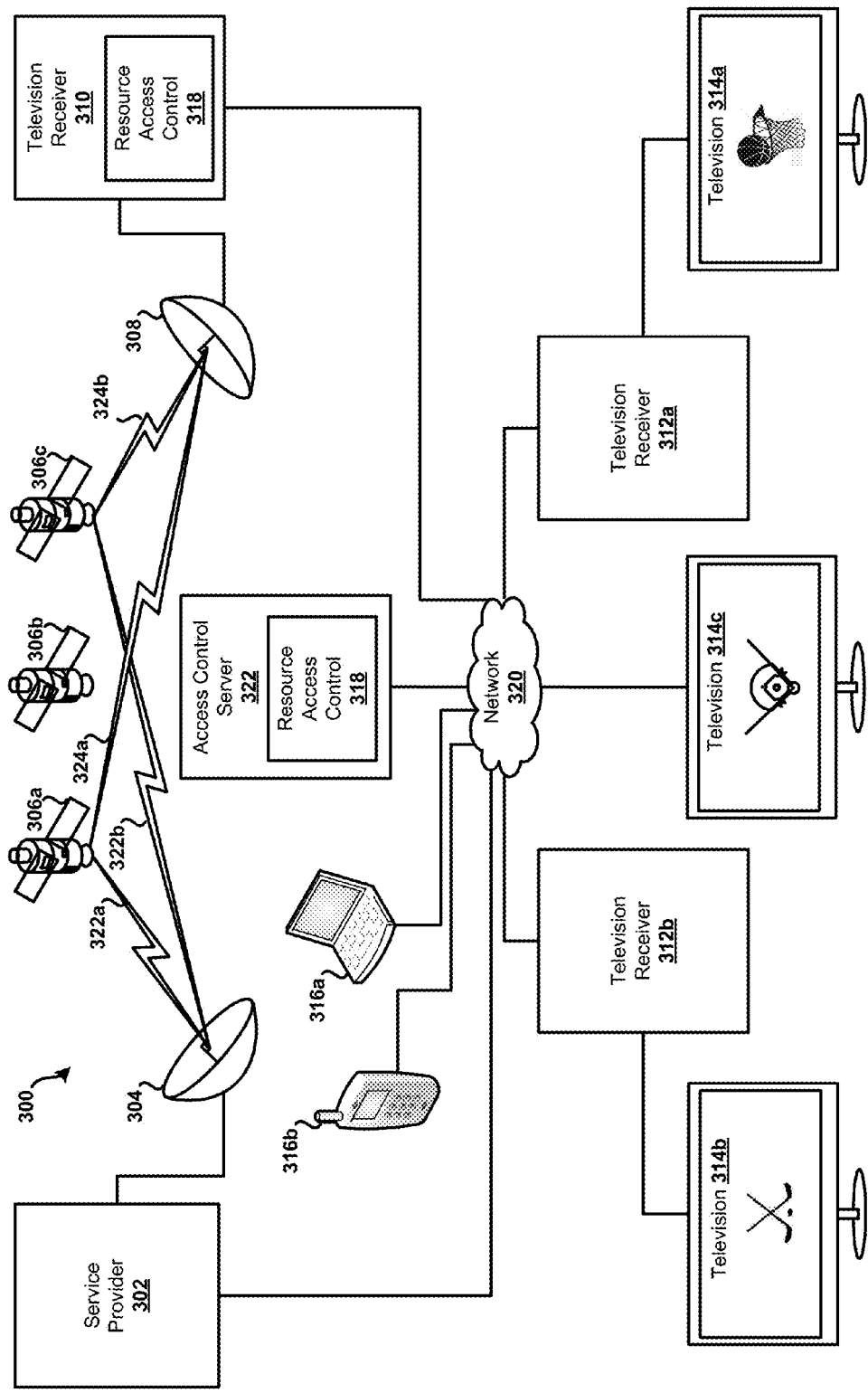
FIG. 3 shows an example media content distribution system in which aspects of the present disclosure may be implemented.

For example, referring now to FIG. 3 an example media content distribution system 300 is shown in which aspects of the present disclosure may be implemented. For brevity, the system 300 is depicted in a simplified and conceptual form, and may generally include more or fewer systems, devices, networks, and/or other components as desired. Further, number and type of features or elements incorporated within the system 300 may or may not be implementation-specific, and at least some of the aspects of the system 300 may be similar to a cable television distribution system, an IPTV (Internet Protocol Television) content distribution system, and/or any other type of media or content distribution system.

The example system 300 may include a service provider 302, a satellite uplink 304, a plurality of orbiting (e.g., geosynchronous) satellites 306a-c, a satellite dish 308, a PTR (Primary Television Receiver) 310, a plurality of STRs (Secondary Television Receivers) 312a-b, a plurality of televisions 314a-c, a plurality of computing devices 316a-b, and at least one access control server 322. In the present example, the PTR 310 and the access control server 322 each may at least include an instance of a RAC (Resource Access Control) module 318. In general, the RAC module 318 may in one aspect be configured to implement one or more features associated with the "Remote Parental Control with Reward Unlock" and the "Network-Wide Remote Parental Control" of the present disclosure. Further, while particular instances of the RAC module 318 as shown in FIG. 3 (i.e., RAC module 318a, RAC module 318b) may be configured substantially the same, certain features of the respective instances of the RAC module 318 may be specific to the type of device each of those instances are associated with. In this manner, certain features of the respective instances of the RAC module 318 may or may not be implementation specific, as discussed in further detail below.

The system 300 may also include at least one network 320 that establishes a bi-directional communication path for data transfer between and among the PTR 310, STRs 312a-b, televisions 314a-c, computing devices 316a-b, and access control server 322 of the example system 300. In some embodiments, the network 320 may further establish a bi-directional communication path for data transfer between the PTR 310 and the service provider 302. The network 320 is intended to represent any number of terrestrial and/or non-terrestrial network features or elements. For example, the network 320 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the example system 300.

The PTR 310, and the STRs 312a-b, as described throughout may generally be any type of television receiver, such as a STB (Set-Top-Box) for example. In another example, the PTR 310, and the STRs 312a-b, may exhibit functionality integrated as part of or into a television, a DVR, a computer such as a tablet computing device, or any other computing system or device, as well as variations thereof. Further, the PTR 310 and the network 320, together with the STRs 312a-b and televisions 314a-c, and possibly the computing devices 316a-b and access control server(s) 322, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 300 may be configured to communicate in accordance with the MoCA® (Multimedia over Coax Alliance) home entertainment networking standard. Other embodiments are possible.

In practice, the satellites 306a-c may each be configured to receive uplink signals 324a-b from the satellite uplink 304. In this example, the uplink signals 324a-b may contain one or more transponder streams of particular data or content, such as particular television channel, that is supplied by the service provider 302. For example, each of the respective uplink signals 324a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 306a-c. Further, different media content may be carried using different transponders of a particular satellite (e.g., satellite 306a); thus, such media content may be transmitted at different frequencies and/or different frequency ranges. For example, a first and second television channel may be carried on a first carrier frequency over a first transponder of satellite 306a, and a third, fourth, and fifth television channel may be carried on second carrier frequency over a first transponder of satellite 306b, or, the third, fourth, and fifth television channel may be carried on a second carrier frequency over a second transponder of satellite 306a, and etc.

The satellites 306a-c may further be configured to relay the uplink signals 324a-b to the satellite dish 308 as downlink signals 326a-b. Similar to the uplink signals 324a-b, each of the downlink signals 326a-b may contain one or more transponder streams of particular data or content, such as various encoded and/or at least partially electronically scrambled television channels, on-demand programming, etc., in accordance with an allotted carrier frequency and bandwidth. The downlink signals 326a-b, however, may not necessarily contain the same or similar content as a corresponding one of the uplink signals 324a-b. For example, the uplink signal 324a may include a first transponder stream containing at least a first group or grouping of television channels, and the downlink signal 326a may include a second transponder stream containing at least a second, different group or grouping of television channels. In other examples, the first and second group of television channels may have one or more television channels in common. In sum, there may be varying degrees of correlation between the uplink signals 324a-b and the downlink signals 326a-b, both in terms of content and underlying characteristics.

Continuing with the example implementation scenario, the satellite dish 308 may be provided for use to receive television channels (e.g., on a subscription basis) provided by the service provider 302, satellite uplink 304, and/or satellites 306a-c. For example, the satellite dish 308 may be configured to receive particular transponder streams, or downlink signals 326a-b, from one or more of the satellites 306a-c. Based on the characteristics of the PTR 310 and/or satellite dish 308, however, it may only be possible to capture transponder streams from a limited number of transponders concurrently. For example, a tuner of the PTR 310 may be configured to tune to a single transponder stream from a transponder of a single satellite at a time.

Additionally, the PTR 310, which is communicatively coupled to the satellite dish 308, may subsequently select via tuner, decode, and relay particular transponder streams to the television 314c for display thereon. For example, the satellite dish 308 and the PTR 310 may, respectively, be configured to receive, decode, and relay at least one premium HD-formatted television channel to the television 314c. Programming or content associated with the HD channel may generally be presented "live," or from a recording as previously stored on, by, or at the PTR 310. In this example, the HD channel may be output to the television 314c in accordance with the HDMI/HDCP content protection technologies. Other embodiments are possible. For example, in some embodiments, the HD channel may be output to the television 314c in accordance with the MoCA® (Multimedia over Coax Alliance) home entertainment networking standard. Still other embodiments are possible.

Further, the PTR 310 may select via tuner, decode, and relay particular transponder streams to one or both of the STRs 312a-b, which may in turn relay particular transponder streams to a corresponding one of the television 314a and the television 314a for display thereon. For example, the satellite dish 308 and the PTR 310 may, respectively, be configured to receive, decode, and relay at least one television channel to the television 314a by way of the STR 312a. Similar to the above-example, the television channel may generally be presented "live," or from a recording as previously stored on the PTR 310, and may be output to the television 314a by way of the STR 312a in accordance with a particular content protection technology and/or networking standard. Other embodiments are possible.

Still further, the satellite dish 308 and the PTR 310 may, respectively, be configured to receive, decode, and relay at least one premium television channel to one or both of the computing devices 316a-b. Similar to the above-examples, the television channel may generally be presented "live," or from a recording as previously stored on the PTR 310, and may be output to one or both of the computing devices 316a-b in accordance with a particular content protection technology and/or networking standard. Other embodiments are possible.

Figure 4:
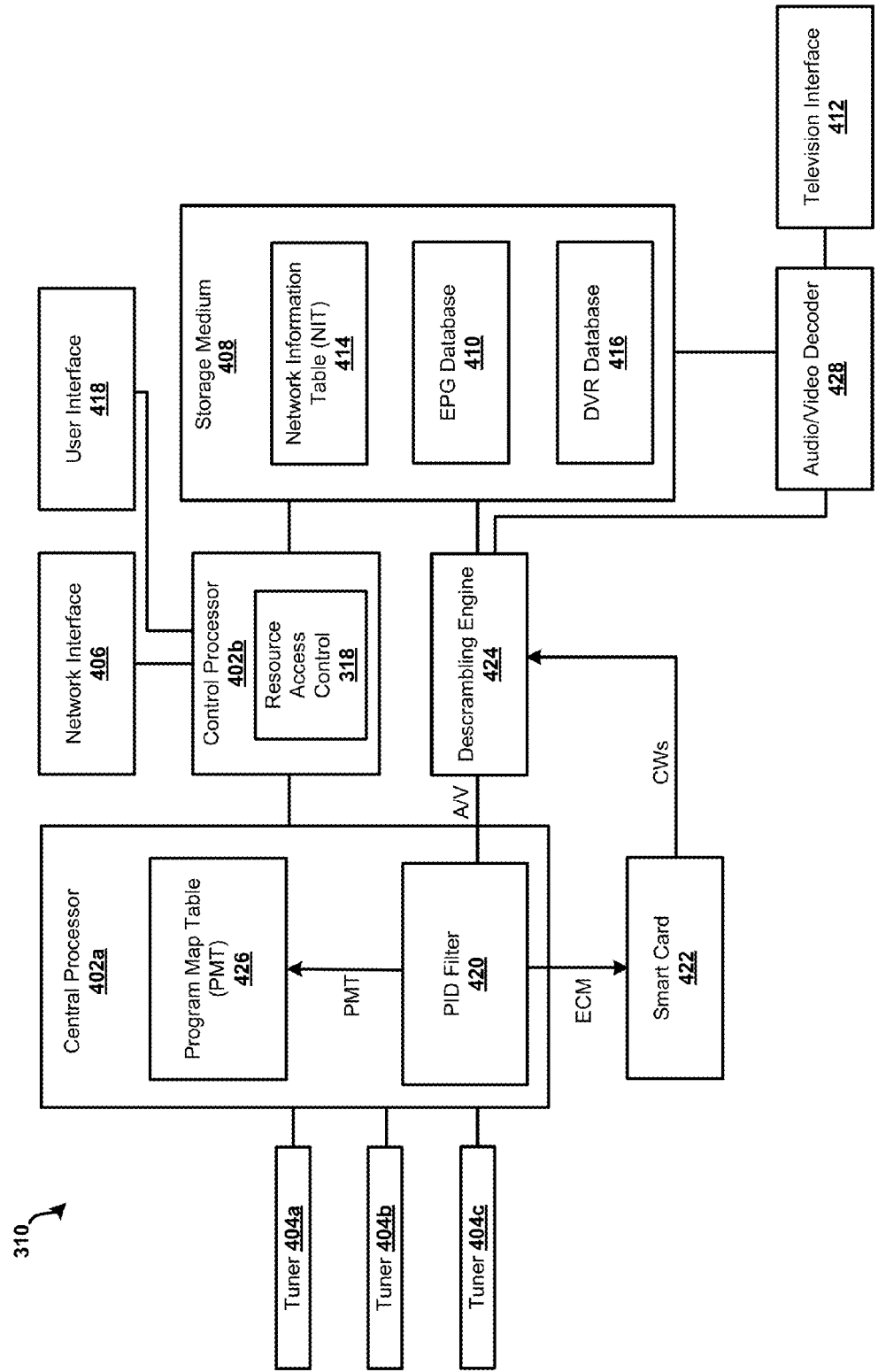
FIG. 4 shows a simplified block diagram of a television receiver of FIG. 3.

Referring now to FIG. 4, a simplified block diagram of the PTR 310 of FIG. 3 is shown in accordance with the present disclosure. In some embodiments, at least one of the STRs 312a-b may be configured in a manner similar to that of the PTR 310. In other embodiments, at least one of the STRs 312a-b may be configured to exhibit a reduced functionality as compared to the PTR 310, and may depend at least to a certain degree on the PTR 310 to implement certain features or functionality. In this example, the STRs 312a-b may be referred to as a "thin client."

For brevity, the PTR 310 is depicted in a simplified and conceptual form, and may generally include more or fewer elements or components as desired in accordance with the present disclosure. For example, the PTR 310 is shown in FIG. 4 to include the RAC module 318 as mentioned above in connection with FIG. 3. Additionally, although not explicitly shown in FIG. 4, the PTR 310 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 310 may be configured to include any number of other various components or logical modules that are implemented in hardware, software, firmware, or any combination thereof, and such components or logical modules may or may not be implementation-specific.

In some embodiments, the PTR 310 and/or the STRs 312a-b comprises of a STB. In addition to being in the form of an STB, at least the PTR 310 may be incorporated into another device, such as the television 314c as shown in FIG. 3. For example, the television 314c may have an integrated television receiver that does not involve an external STB being coupled with the television 314c. A STB may contain some or all of the components of the PTR 310 and/or may be able to perform some or all of the functions of the PTR 310. Accordingly, instances in this document referring to a STB, and steps being performed by a STB, may also be performed, more generally, by the PTR 310 and/or STRs 312a-b.

Referring still to FIG. 4, the PTR 310 may include at least one processor 402, including a central processor 402a and a control processor 402b, a plurality of tuners 404a-c, at least one network interface 406, at least one non-transitory computer-readable storage medium 408, at least one EPG database 410, at least one television interface 412, at least one NIT (Networking Information Table) 414, at least one DVR database 416, at least one user interface 418, at least one PID filter 420, at least one smart card 422, at least one descrambling engine 424, at least one PMT (Program Map Table) 426, and at least one decoder 428. In other embodiments of the PTR 310, fewer or greater numbers of components may be present. Further, functionality of one or more components may be combined; for example, functions of the descrambling engine 424 may be performed by the central processor 402a. Still further, functionality of components may be spread among additional components. For example, the PID filter 420 may be handled by hardware and/or software separate from the PMT 426.

The processor 402 may include one or more specialized and/or general-purpose processors configured to perform processes such as tuning to a particular channel, accessing and displaying EPG information from the EPG database 410, and/or receiving and processing input from a user. For example, processor 402 may include one or more processors dedicated to decoding video signals from a particular format, such as MPEG (Moving Picture Experts Group), for output and display on a television and for performing decryption.

The control processor 402b may communicate with the central processor 402a. The control processor 402b may control the recording of television channels based on timers stored in the DVR database 416. The control processor 402b may initiate recording of a television channel by sending a record command along with an indication of the television channel to be recorded to the central processor 402a. The control processor 402b may not send a second record command, when additional recording is to begin at the same time, until an acknowledgement that recording of the first television channel has successfully been received and initiated by the central processor 402a. The control processor 402b may also provide commands to the central processor 402a when recording of a television channel is to cease. In addition to providing commands relating to the recording of television channels, the control processor 402b may provide commands to the central processor 402a that indicate television channels to be output to the decoder 428 for output to a presentation device, such as the television 314c for example.

The control processor 402b may also communicate with the network interface 406 and the user interface 418. The control processor 402b may handle in-coming data from the network interface 406 and the user interface 418. Additionally, the control processor 402b may be configured to output data via the network interface 406.

The tuners 404a-c may be used to tune to television channels, such as television channels transmitted via satellite or cable, such as satellites 306a-c. Each respective one of the tuner 404a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 404a) may be used to tune to a television channel on a first transponder stream for display using a television, while another tuner (e.g., tuner 404b) may be used to tune to a television channel on a second transponder for recording and viewing at some other time. Still another tuner (e.g., tuner 404c) may be used to check various television channels to determine if they are available or not. If multiple television channels transmitted on the same transponder stream are desired, a particular tuner (e.g., tuner 404a) may be used to receive the signal containing the multiple television channels for presentation and/or recording. The tuners 404a-c may receive commands from the central processor 402a. Such commands may instruct the tuners 404a-c which frequencies are to be used for tuning.

The network interface 406 may be used to communicate via an alternate communication channel with a television service provider. For example, the primary communication channel may be via satellite, which may be unidirectional to the STB, and the alternate communication channel, which may be bidirectional, may be via a network, such as the Internet. The PTR 310 may be able to communicate with the service provider 302 of FIG. 3 via a network, such as the Internet. This communication may be bidirectional. For example, data may be transmitted from the PTR 310 to the service provider 302, and from the service provider 302 to the PTR 310. The network interface 406 may be configured to communicate via one or more networks, such as the Internet, to communicate with the service provider 302. Information may be transmitted and/or received via the network interface 406.

The storage medium 408 may represent a non-transitory computer-readable storage medium. The storage medium 408 may include memory and/or a hard drive. The storage medium 408 may be used to store information received from one or more satellites and/or information received via the network interface 406. The storage medium 408 may store information related to the EPG database 410, the NIT 414, and/or the DVR database 416. Recorded television programs may be stored using the storage medium 408. The storage medium 408 may be partitioned or otherwise divided such that predefined amounts of the storage medium 408 are devoted to storage of omnibus channel files and user-selected television programs.

The EPG database 410 may store information related to television channels and the timing of programs appearing on such television channels. The EPG database 410 may be stored using the storage medium 408, which may be a hard drive. Information from the EPG database 410 may be used to inform users of what television channels or programs are popular and/or provide recommendations to the user. Information from the EPG database 410 may provide the user with a visual interface displayed by a television that allows a user to browse and select television channels and/or television programs for viewing and/or recording. Information used to populate the EPG database 410 may be received via the network interface 406 and/or via satellites, such as satellites 306a-c of FIG. 3 via the tuners 404a-c. For instance, updates to the EPG database 410 may be received periodically via satellite. The EPG database 410 may serve as an interface for a user to control DVR functions of the PTR 310, and/or to enable viewing and/or recording of multiple television channels simultaneously.

In addition to being used to provide users with information about scheduled programming, information from the EPG database 410 may be used to determine when television programs begin and end for the purposes of recording. For instance, when a channel-specific file is recorded that contains multiple television channels, the start and end of time of specific television programs within the channel-specific file may be based on the start and end times indicated in the EPG database 410. Other data may be stored within the EPG database 410 that may be useful in managing channel-specific files, such as series identifiers and episode identifiers, which may be used by a television service provider to identify particular television programs.

The decoder 428 may serve to convert encoded video and audio into a format suitable for output to a display device. For instance, the decoder 428 may receive MPEG video and audio from the storage medium 408, or the descrambling engine 424, to be output to a television. MPEG video and audio from the storage medium 408 may have been recorded to the DVR database 416 as part of a previously-recorded television program. The decoder 428 may convert the MPEG video and audio into a format appropriate to be displayed by a television or other form of display device and audio into a format appropriate to be output from speakers, respectively.

The television interface 412 may serve to output a signal to a television, or another form of display device, in a proper format for display of video and playback of audio. As such, the television interface 412 may output one or more television channels, stored television programming from the storage medium 408, such as television programs from the DVR database 416 and/or information from the EPG database 410 for example, to a television for presentation.

The NIT 414 may store information used by the PTR 310 to access various television channels. The NIT 414 may be stored using the storage medium 408. Information used to populate the NIT 414 may be received via satellite, or cable, via the tuners 404a-c and/or may be received via the network interface 406 from a service provider. As such, information present in the NIT 414 may be periodically updated. The NIT 414 may be locally-stored by the PTR 310 using the storage medium 408. Information that may be present in the NIT 414 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 414 may be divided into additional tables. For example, rather than the specific audio PIDs and video PIDs being present in the NIT 414, a channel identifier may be present within NIT 414 which may be used to look up the audio PIDs and video PIDs in another table, such as the PMT 426. For example, the PMT 426 may store information on audio PIDs and video PIDs for television channels that are transmitted on a transponder frequency.

Table 1 provides a simplified example of the NIT 414 for several television channels. It should be understood that in other embodiments, many more television channels may be represented in the NIT 414. The NIT 414 may be at least periodically updated by a television service provider. As such, television channels may be reassigned to different satellites and/or transponders, and the PTR 310 may be able to handle this reassignment as long as the NIT 414 is updated.

TABLE 1

| Channel | Satellite | Transponder | ECM PID | PMT PID |
| --- | --- | --- | --- | --- |
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 414, it may be possible to determine the proper satellite and transponder to which to tune for a particular television channel. In some embodiments, the NIT 414 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 414. The same PID may be reused on different transponders.

A DVR may permit a television channel to be recorded for a period of time. DVR functionality of the PTR 310 may be managed by the control processor 402b. The control processor 402b may coordinate the television channel, start time, and stop time of when recording of a television channel is to occur. The DVR database 416 may store information related to the recording of television stations. The DVR database 416 may store timers that are used by the control processor 402b to determine when a television channel should be tuned to and its programs recorded to the DVR database 416. However, other embodiments are possible. For example, in some embodiments, the storage medium 408 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 408 may be devoted to the DVR database 416. Timers may be set by a service provider and/or one or more users of the PTR 310.

DVR functionality of the control processor 402b may have multiple modes. For example, DVR functionality of the control processor 402b may be configured to record individual television programs selected by a user to the DVR database 416. Using the EPG database 410, a user may select a particular television program. Based on the date, time period, and television channel indicated by the EPG database 410, the control processor 402b may record the associated television program to the DVR database 416. In another example, the DVR database 416 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 302).

As an example of this second mode of DVR functionality, a television service provider may configure the PTR 310 to record television programming on multiple, predefined television channels for a predefined period of time, on predefined dates. For instance, a television service provider may configure the PTR 310 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

The user interface 418 may include a remote control, physically separate from PTR 310, and/or one or more buttons on the PTR 310 that allows a user to interact with the PTR 310. The user interface 418 may be used to select a television channel for viewing, view information from the EPG database 410, and/or program a timer stored to the DVR database 416 wherein the timer may be used to control the DVR functionality of the control processor 402b.

Referring back to tuners 404a-c, television channels received via satellite, or cable, may contain at least some scrambled data. Packets of audio and video may be scrambled to prevent unauthorized users, such as nonsubscribers, from receiving television programming without paying the television service provider. When one of the tuners 404a-c is receiving data from a particular transponder of a satellite, the transponder stream may be a series of data packets corresponding to multiple television channels. Each data packet may contain a PID, which, in combination with the NIT 414 and/or the PMT 426, can be determined to be associated with particular television channel. Particular data packets, referred to as ECMs may be periodically transmitted. ECMs may be associated with another PID and may be encrypted; the PTR 310 may use the smart card 422 to decrypt ECMs. Decryption of an ECM may only be possible when the user (e.g., PTR 310) has authorization to access the particular television channel associated with the ECM. When an ECM is determined to correspond to a television channel being stored and/or displayed, the ECM may be provided to the smart card 422 for decryption.

When the smart card 422 receives an encrypted ECM, the smart card 422 may decrypt the ECM to obtain some number of control words. In some embodiments, from each ECM received by the smart card 422, two control words are obtained. In some embodiments, when the smart card 422 receives an ECM, it compares the ECM to the previously received ECM. When the two ECMs match, the second ECM is not decrypted because the same control words would be obtained. In other embodiments, each ECM received by the smart card 422 is decrypted; however, when a second ECM matches a first ECM, the outputted control words will match; thus, effectively, the second ECM does not affect the control words output by the smart card 422. The smart card 422 may be permanently part of the PTR 310 or may be configured to be inserted and removed from PTR 310.

The central processor 402a may be in communication with the tuners 404a-c and the control processor 402b. The central processor 402a may be configured to receive commands from the control processor 402b. Such commands may indicate when to start/stop recording a television channel and/or when to start/stop causing a television channel to be output to a television. The central processor 402a may control the tuners 404a-c. The central processor 402a may provide commands to the tuners 404a-c that instruct the tuners which satellite, transponder, and/or frequency to tune to. From the tuners 404a-c, the central processor 402a may receive transponder streams of packetized data. As previously detailed, some or all of these packets may include a PID that identifies the content of the packet.

The central processor 402a may be configured to create at least one PID filter 420 that sorts packets received from the tuners 404a-c based on the PIDs. When a tuner is initially tuned to a particular frequency, such as a particular transponder of a satellite, a PID filter may be created based on a PID of PMT data. The PID of PMT data packets may be known because it is stored as part of the NIT 414. From the PMT data packets, the PMT 426 may be constructed by central processor 402a. Table 2 provides an exemplary extract of a PMT. The PMT 426 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 426, the audio and video PIDs for specific television channels may be identified. A television channel may have multiple audio PIDs due to a second audio program, which may be in a different language.

It should be understood that the values provided in Table 2 are for example purposes only. Actual values may vary. Additional information or less information may also be stored in the PMT 426.

The PID filter 420 may be configured to filter data packets based on PIDs. In some embodiments, the PID filter 420 is created and executed by central processor 402a. In other embodiments, separate hardware may be used to create and execute multiple PID filters. Depending on a television channel selected for recording/viewing, a PID filter may be created to filter the video and audio packets associated with the television channel, based on the PID assignments present in the PMT 426. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 424 or the smart card 422; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 414, may be appropriately routed by the PID filter 420. At a given time, one or multiple PID filters may be executed by the central processor 402a.

The descrambling engine 424 may use the control words output by the smart card 422 in order to descramble video and/or audio corresponding to television channels for storage and/or presentation. Video and/or audio data contained in the transponder data stream received by the tuners 404a-c may be scrambled. Video and/or audio data may be descrambled by descrambling engine 424 using a particular control word. Which control word output by the smart card 422 to be used for successful descrambling may be indicated by a scramble control identifier present within the data packet containing the scrambled video or audio. Descrambled video and/or audio may be output by the descrambling engine 424 to the storage medium 408 for storage in the DVR database 416 and/or to the decoder 428 for output to a television or other presentation equipment via the television interface 412.

For simplicity, the PTR 310 of FIG. 4 has been reduced to a block diagram; commonly known parts, such as a power supply, have been omitted. Further, some routing between the various modules of PTR 310 has been illustrated. Such illustrations are for exemplary purposes only. The state of two modules not being directly or indirectly connected does not indicate the modules cannot communicate. Rather, connections between modules of the PTR 310 are intended only to indicate possible common data routing. It should be understood that the modules of the PTR 310 may be combined into a fewer number of modules or divided into a greater number of modules. Further, the components of the PTR 310 may be part of another device, such as built into a television. Also, while the PTR 310 may be used to receive, store, and present television channels received via a satellite, it should be understood that similar components may be used to receive, store, and present television channels via a cable network.

Figure 5:
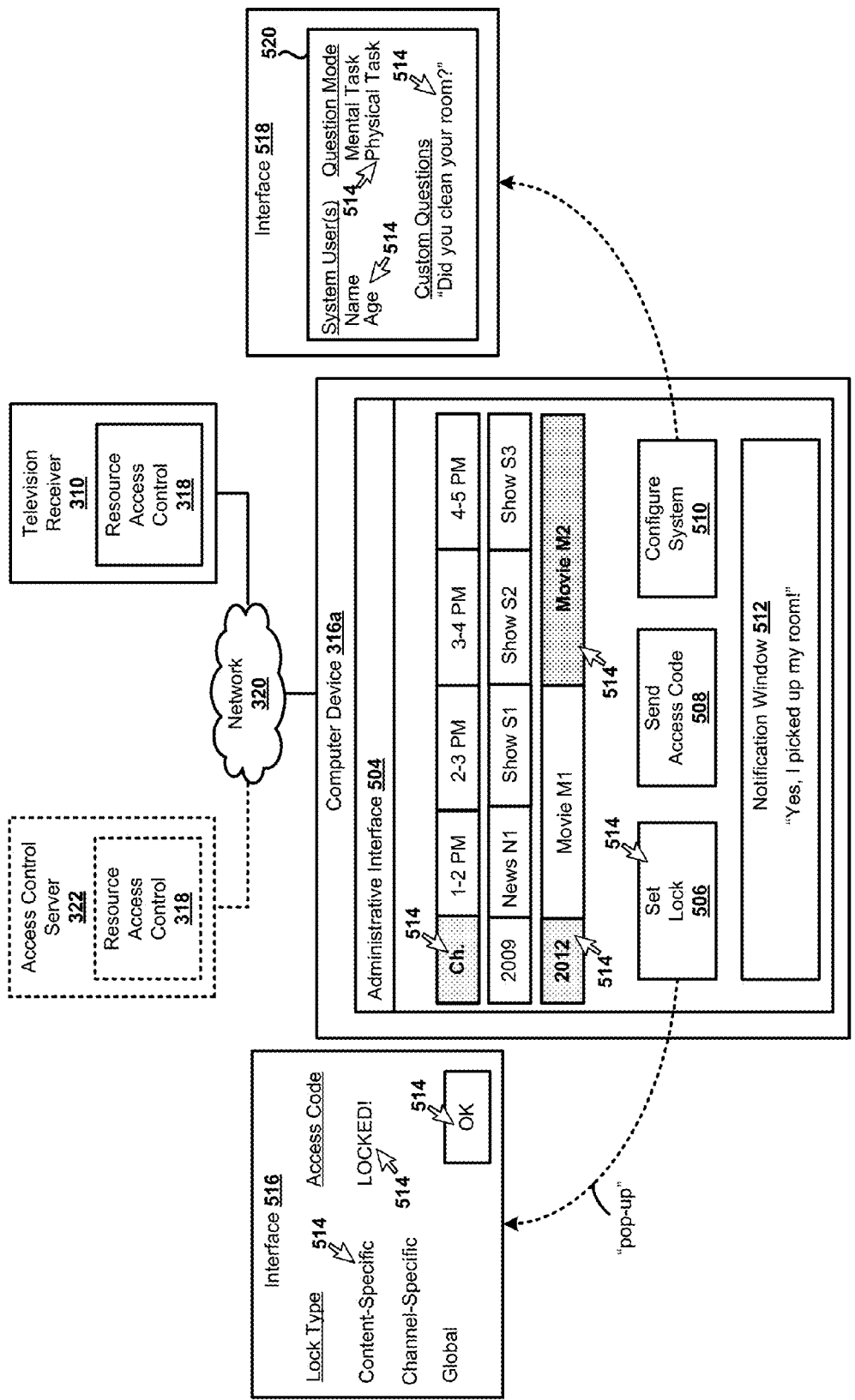
FIG. 5 shows example aspects of the example system of FIG. 3 in detail.

Referring now to FIG. 5, aspects of the example system 300 of FIG. 3 are shown in detail. More specifically, FIG. 5 shows the PTR 310 and the computing device 316a of FIG.

3. Other embodiments than those depicted in FIG. 5 are possible. For example, in some embodiments, the RAC module 318 of the PTR 310 may be wholly or at least partially located on one or more other components of the example system 300 of FIG. 3. For example, the RAC module 318 may be wholly or at least partially located on a particular one of the STRs 312a-b. Further, the RAC module 318 may optionally be wholly or at least partially located on at least one access control server 322, where the "option" is indicated in FIG. 5 by intermittent line. Such an implementation may free particular computing resources of the PTR 310, such that the PTR 310 may more efficiently perform various other tasks. Other advantages may be possible as well.

In practice, the RAC module 318 of the PTR 310 may be configured to output an administrative interface 504 to and for presentation by at least the computing device 316a. The administrative interface 504 may enable an administrator to configure and/or manage aspects of the various parental control concepts of the present disclosure. For example, the administrative interface 504 may present various information related to television channels and the timing of programs or programming appearing on such television channels, such as programs or programming as received from one or more of the satellites 306a-c.

For example, the administrative interface 504 may display channel information associated with a channel "2009," where a "Show S1" may be listed as scheduled to appear on the channel 2009 during a particular time period "2-3 PM" of a particular day. The administrative interface 504 may further display channel information associated with a channel "2012," where a "Movie M2" may be listed as scheduled to appear on the channel 2012 during a particular time period "3-5 PM" of the particular day. Other embodiments are possible. For example, more or fewer programs or programming may be listed within the administrative interface 504. Further, programming listed within the administrative interface 504 may correspond to recorded content or "live" content. Still other embodiments are possible.

The administrative interface 504 may further present a first selectable icon 506, a second selectable icon 508, a third selectable icon 510, and a notification window 512. Such features may enable an administrator to configure and/or manage various aspects of the parental control concepts of the present disclosure.

For example, as shown in FIG. 5, an administrator may manipulate a cursor 514 using a pointing device (not shown) to select the first selectable icon 506. In response, the RAC module 318 of the PTR 310 may be configured to output a first interface 516 to and for presentation within the administrative interface 504. Here, the administrator may manipulate the cursor 514 within the first interface 516 to set a "lock" to prevent unauthorized access to particular broadcast programming. For example, as shown in FIG. 5, the administrator may manipulate the cursor 514 to set one of: a "content-specific" parental control lock; a "channel-specific" parental control lock; and a "global" parental control lock.

In example embodiments, a content-specific programming lock mode may correspond to a lock that restricts access to broadcast programming associated with a particular broadcast program. For example, the administrator may manipulate the cursor 514 within the administrative interface 504 to "select" (e.g., as shown by stipple shading in FIG. 5) the "Movie M2," and then manipulate the cursor 514 within the first interface 516 to select the content-specific programming lock indicator within the first interface 516 to set a lock that prevents unauthorized viewing of the "Movie M2."

Further, a channel-specific programming lock mode may correspond to a lock that restricts access to all broadcast programming associated with a particular broadcast channel or station. For example, the administrator may manipulate the cursor 514 within the administrative interface 504 to "select" the indicator "2012" (e.g., as shown by stipple shading in FIG. 5) associated with the channel 2012, and then manipulate the cursor 514 within the first interface 516 to select the channel-specific programming lock indicator within the first interface 516 to set a lock that prevents unauthorized viewing of all content associated with or broadcast on the channel 2012. For example, this lock may prevent unauthorized viewing of at least the "Movie M1" and the "Movie M2" as shown listed in FIG. 5.

Further, a global programming lock mode may correspond to a lock that restricts access to all broadcast programming as received at or by the PTR 310. For example, the administrator may manipulate the cursor 514 within the administrative interface 504 to "select" the indicator "Ch." (e.g., as shown by stipple shading in FIG. 5) to indicate selection of "all" available channels, and then manipulate the cursor 514 within the first interface 516 to select the global programming lock indicator within the first interface 516 to set a lock that prevents unauthorized viewing of all content as received at or by the PTR 310. For example, this lock may prevent unauthorized viewing of at least the "News N1" and the "Show S1" and the "Show S2" and the "Show S3" and the "Movie M1" and the "Movie M2" as shown listed in FIG. 5.

The administrator may further manipulate the cursor 514 within the first interface 516 to set a password or access code that when used may remove or otherwise disable an existing lock that prevents unauthorized access to particular broadcast programming. For example, as shown in FIG. 5, the administrator may manipulate the cursor 514 within the first interface 516 to set a password "LOCKED!" that when used may remove, disable, or otherwise "unlock" an existing lock that prevents unauthorized access to particular broadcast programming. In general, the access code or password may be sent to a particular user by the administrator so that the particular user may remove, disable, or otherwise "unlock" an existing lock. For example, the administrator may manipulate a cursor 514 within the administrative interface 504 to select the second selectable icon 508 to send the access code or password to a particular user. An example of a particular user using an access code or password sent by an administrator is described in further detail below in connection with at least FIG. 6.

As mentioned above, the administrative interface 504 may further present a third selectable icon 510 and a notification window 512. In example embodiments, an administrator may manipulate the cursor 514 to select the third selectable icon 510. In response, the RAC module 318 of the PTR 310 may be configured to output a second interface 518 to and for presentation within the administrative interface 504. Here, the administrator may manipulate the cursor 514 within the second interface 518 to define various information within at least one configuration file 520. For example, as shown in FIG. 5, the administrator may manipulate the cursor 514 to define "Name" (e.g., "My Child") and "Age" (e.g., "8 years old") of one or more systems users. The administrator may further manipulate the cursor 514 to set a particular question or questioning mode that is associated with an existing lock that prevents unauthorized access to particular broadcast programming. In example embodiments, one question mode may correspond to a "Mental Task" question mode, and another question mode may correspond to a "Physical Task" mode. The administrator may further manipulate the cursor 514 to set a particular "custom" question (e.g., "Did you clean your room?"). Features and/or aspects associated with the file 520 and the notification window 512, and how at least the file 520 and the notification window 512 are incorporated and used within the parental control concepts of the present disclosure are discussed in connection with FIG. 6.

Figure 6:
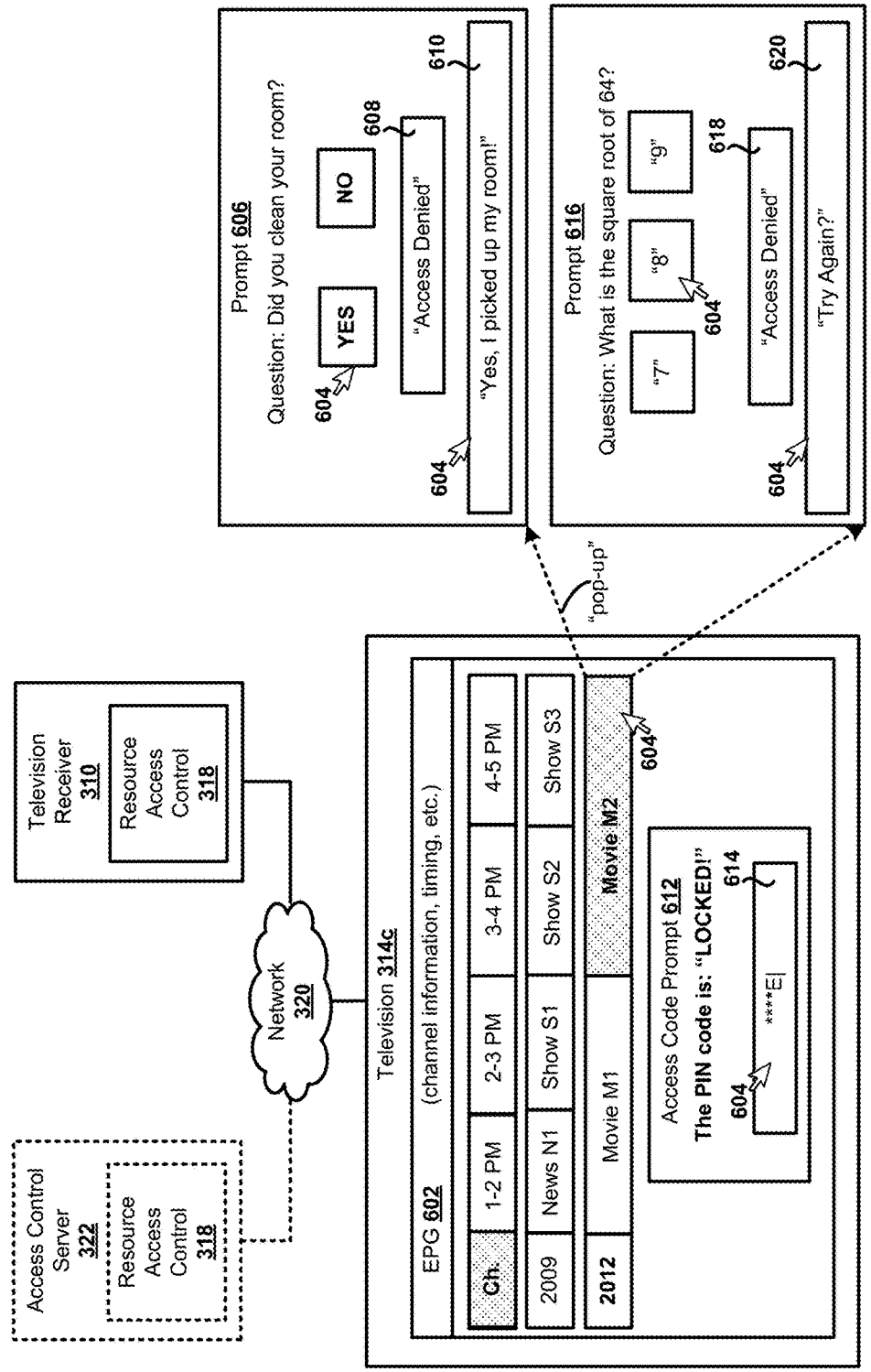
FIG. 6 further shows example aspects of the example system of FIG. 3 in detail.

For example, referring now to FIG. 6, further aspects of the example system 300 of FIG. 3 are shown in detail. More specifically, FIG. 6 shows the PTR 310 and the television 314c of FIG. 3. Other embodiments than those depicted in FIG. 6 are possible. For example, in some embodiments, the RAC module 318 of the PTR 310 may be wholly or at least partially located on one or more other components of the example system 300 of FIG. 3. For example, the RAC module 318 may be wholly or at least partially located on a particular one of the STRs 312a-b. Further, the RAC module 318 may optionally be wholly or at least partially located on at least one access control server 322, where the "option" is indicated in FIG. 6 by intermittent line. Such an implementation may free particular computing resources of the PTR 310, such that the PTR 310 may more efficiently perform various other tasks. Other advantages may be possible as well.

In practice, the PTR 310 may be configured to output an EPG 602 to and for presentation by at least the television 314c. The EPG 602 may at least present various information related to television channels and the timing of programs or programming appearing on such television channels, such as television channels as received from one or more of the satellites 306a-c. For example, the EPG 602 may display channel information associated with a channel "2009," where a show "Show S1" may be listed as scheduled to appear on the channel 2009 during a particular time period "2-3" PM of a particular day. The EPG 602 may further display channel information associated with a channel "2012," where a "Movie M2" may be listed as scheduled to appear on the channel 2012 during a particular time period "3-5 PM" of the particular day. Other embodiments are possible. For example, more or fewer programs or programming may be listed within the EPG 602. Further, programming listed within the EPG 602 may correspond to recorded content or "live" content. Still other embodiments are possible.

In the example of FIG. 6, and assuming that a current time is sometime during the time period 3-5 PM, a user may manipulate a cursor 604 using a pointing device (not shown) to select the "Movie M2" for immediate viewing on the television 314c, as shown by stipple shading in FIG. 6. Here, however, it is assumed that an administrator has previously "set" a particular programming lock to prevent unauthorized viewing of the "Movie M2." For example, an administrator may have previously set one of a content-specific parental control lock, a channel-specific parental control lock, or a global parental control lock to prevent unauthorized access or viewing of the "Movie M2," in a manner as described above in connection with FIG. 5. In this example, it is further assumed that an administrator has previously accessed the second interface 518 to define various information within the file 520, as mentioned above in connection with FIG. 5. Here, information as contained or otherwise defined within the second interface 518 may dictate or influence a "type" of user interface that is output by the RAC module 318 of the PTR 310 for display by the television 314c in response to user selection of the movie "Movie M1." In general, a particular user interface may display a question that when answered correctly removes the lock or "unlocks" the lock that is set to prevent unauthorized access to the movie "Movie M2."

For example, assuming that an administrator has previously accessed the second interface 518 and selected the "Physical Task" question mode to be associated with the existing lock defined to prevent unauthorized access to the "Movie M2," the RAC module 318 may be configured to output a first user prompt 606 to and for presentation by the television 314c in response to user selection of the "Movie M2" for immediate viewing. The first user prompt 606 may present a question "Did you clean your room?" along with a pair of user-selectable icons "Yes" and "No" so that the user may respond to the question. In this example, the question "Did you clean your room?" corresponds to the "custom" question defined by an administrator within the file 520, discussed above in connection with FIG. 5. Other embodiments are possible.

In one embodiment, the user may further manipulate the cursor 604 within the first user prompt 606 to select the user-selectable icon "No" to indicate that the particular task has not been performed. In this case, an "access denied" message 608 may be presented with the first user prompt 606 and/or by or on the television 314c. In another embodiment, the user may further manipulate the cursor 604 within the first user prompt 606 to select the user-selectable icon "Yes" to confirm that the particular task has been performed. The user may further manipulate the cursor 604 within the first user prompt 606 to access a text box 610 to send a message to the administrator "Yes, I picked up my room!" This message may be presented to the administrator within the notification window 512 of the administrative interface 504 (see e.g., FIG. 5). Other embodiments are possible. For example, in some embodiments, an image such as a picture of the of the room may be uploaded and displayed within the notification window 512, so the user may "see" that the room has in fact been "picked-up." Since this message, along with selection of the user-selectable icon "Yes" to confirm that the particular task has been performed, is likely the desired answer to the posed question (e.g., a parent may want to make sure a child cleaned their room before watching a movie), the administrator may select the second selectable icon 508 to send an access code or password to the user, so that the user may remove, disable, or otherwise "unlock" the existing lock that prevents unauthorized access to the "Movie M2."

For example, assuming that the administrator has selected the second selectable icon 508 to send an access code or password to the user, the RAC module 318 may be configured to output an access code prompt 612 to and for presentation by the television 314c. In one embodiment, the access code prompt 612 may display the password "LOCKED!" and provide an access code text box 614 so that the user may enter the password "LOCKED!" to remove, disable, or otherwise "unlock" the existing lock that prevents unauthorized access to the "Movie M2." Subsequently, the user may access the "Movie M2" for immediate viewing on or by the television 314c as desired.

In another example, assuming that an administrator has previously accessed the second interface 518 and selected the "Mental Task" question mode to be associated with the existing lock defined to prevent unauthorized access to the "Movie M2," the RAC module 318 may be configured to output a second user prompt 616 to and for presentation by the television 314c in response to user selection of the "Movie M2" for immediate viewing. The second user prompt 616 may present a question "What is the square root of 64?" including an icon associated with the number "7," an icon associated with the number "8," and an icon associated with the number "9." In this example, the question "What is the square root of 64?" may be automatically selected by the RAC module 318 for presentation within the second user prompt 616 based on one or more parameters. For example, the RAC module 318 may query the file 520 and select a mathematical problem considered to have a difficulty consistent with expected education and level of sophistication of a child or minor specified within the file 520. For example, the RAC module 318 may determine that a child "8 years old" may be able to successfully solve the problem "What is the square root of 64?" Other embodiments are possible.

In one embodiment, the user may further manipulate the cursor 604 within the second user prompt 616 to select the icon associated with the number "7," or the icon associated with the number "9." Here, the answer is "incorrect," and an "access denied" message 618 may be presented with the second user prompt 616 and/or by or on the television 314c. Further, a "Try Again?" message 620 may be presented with the second user prompt 616 and/or by or on the television 314c. In this example, the "Try Again?" message 620 may be a user-selectable icon that when selected activates the RAC module 318 to output another, different, mathematical question within the second user prompt 616, so that the user may try again to gain authorized access to the to "Movie M2." In one embodiment, this may be performed ad infinitum. In another embodiment, this may occur only for a predetermined number of times or tries before the user is "locked-out" from attempting to gain authorized access to the "Movie M2" for immediate viewing. In this example, the user may be allowed to try again following passage of a predetermined period of time (e.g., 5 minutes, 10 minutes, etc.). Other embodiments are possible.

In another embodiment, the user may further manipulate the cursor 604 within the second user prompt 616 to select the icon associated with the number "8." Here, the answer is "correct," and since selection of the icon associated with the number "8" represents a verification of correctly answering the question "What is the square root of 64?" the RAC module 318 may in one embodiment provide automatic and instantaneous authorized access to the "Movie M2," so that the user may access the "Movie M2" for immediate viewing on or by the television 314c as desired. Other embodiments are however possible. For example, in some embodiments, the second user prompt 616 may be configured similar to the first user prompt 606 discussed above, whereby a message may be presented within the notification window 512 and an administrator may then select the second selectable icon 508 to send a password as discussed above, so that the user may access the "Movie M2" for immediate viewing on or by the television 314c. Likewise, the first user prompt 606 may configured similar to the second user prompt 616 discussed above so that the process is substantially automated, and does not require an administrator to send an access code and also a user to enter the access code so that the user may access the "Movie M2" for immediate viewing on or by the television 314c.

Figure 7:
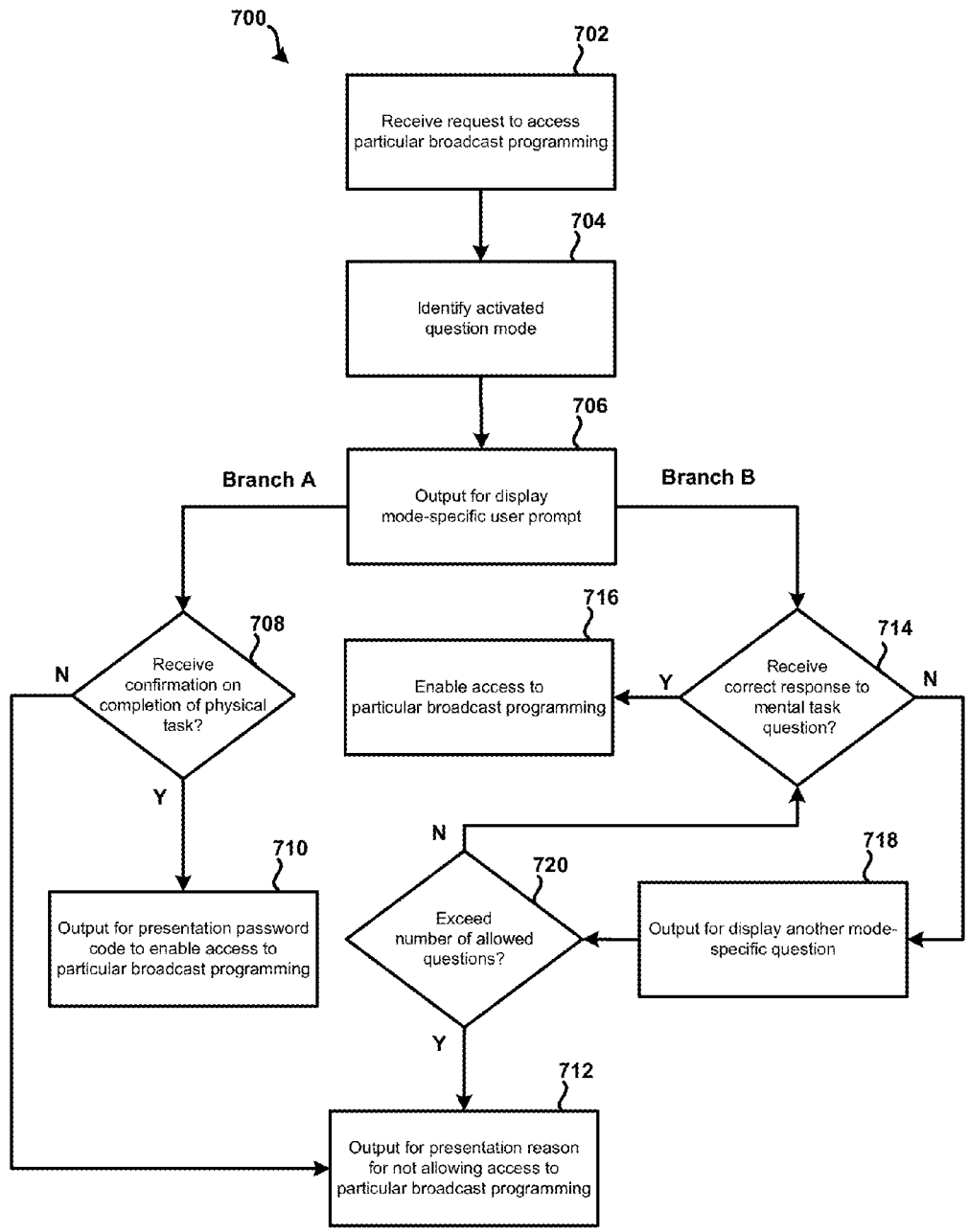
FIG. 7 shows a third example method in accordance with the present disclosure.

Referring now to FIG. 7, a third example method 700 is shown in accordance with the present disclosure. In general, steps or modules of the method 700 as described may ultimately be implemented by or on the PTR 310 of FIG. 3. Other embodiments are however possible. For example, one or more modules or steps of the method 700 may be implemented by or on one or more of the other respective devices or components within the system 300, as described above in connection with at least FIG. 3. Still other embodiments are possible.

At step 702, a television receiver may receive a request to access particular broadcast programming. At step 704, the television receiver may identify or determine a particular question mode that is or has been selected by an administrator to be associated with an existing lock defined to prevent unauthorized access to the particular broadcast programming. At step 706, the television receiver may output for presentation by a display device a particular user prompt based on the particular question mode identified or determined at step 704.

For example, at step 702, the PTR 310 may detect user selection of the "Movie M2" for immediate viewing on the television 314c, such as described above in connection with FIG. 6. Other embodiments are however possible. For example, it is envisioned that any means consistent with menu-driven navigation may be used to interact with an EPG, and thus detection of selection of particular broadcast programming may or may not be implementation specific. At step 704, the PTR 310 may query the file 520, and determine that one of the "Mental Task" question mode and the "Physical Task" question mode is defined or selected to be associated with an existing lock to prevent unauthorized access to the "Movie M2," such as described above in connection with FIG. 5. At step 706, the PTR 310 may output for display by the television 314c the first user prompt 606 when it is determined at step 704 that an activated question mode corresponds to the "Physical Task" question mode. In another example, the PTR 310 may output for display by the television 314c the second user prompt 616 when it is determined at 704 that an activated question mode corresponds to the "Mental Task" question mode. Continuing with this example herein, flow within the example method 700 may proceed according to a "Branch A" when the first user prompt 606 is output for display by the television 314c, and according to a "Branch B" when the second user prompt 616 is output for display by the television 314c.

With respect to "Branch A," at step 708, a determination may be made by the television receiver as to whether confirmation on completion of a physical task has been received. For example, the PTR 310 may detect that a user has manipulated the cursor 604 within the first user prompt 606 to select the user-selectable icon "Yes" to confirm that task "Did you clean your room?" has been performed, such as described above in connection with FIG. 6. Alternatively, the PTR 310 may detect that a user has manipulated the cursor 604 within the first user prompt 606 to select the user-selectable icon "No" to denote that task "Did you clean your room?" has not been performed.

Flow within the example method 700 may branch to step 710 upon a "Yes" determination at step 708, and may branch to step 712 upon a "No" determination at step 708.

At step 710, the television receiver may output for presentation by a display device an access code or password so that user may access the particular programming for immediate viewing on or by the display device. For example, at step 710, the PTR 310 may be configured to output an access code prompt 612 to and for presentation by the television 314c where in one embodiment, the access code prompt 612 may display the password "LOCKED!" and provide an access code text box 614 so that the user may enter the password "LOCKED!" to remove, disable, or otherwise "unlock" the existing lock that prevents unauthorized access to the "Movie M2." Subsequently, the user may access the "Movie M2" for immediate viewing on or by the television 314c as desired. Other embodiments are possible.

At step 712, the television receiver may output for presentation by a display device an indication that a "correct" answer has not been received, and that authorized access to the particular broadcast programming is denied. For example, the PTR 310 may be configured to output an "access denied" message 608 within the first user prompt 606 and/or by or on the television 314c indicating that the existing lock that prevents unauthorized access to the "Movie M2" is still activated and that the user may not proceed access the "Movie M2" for immediate viewing on or by the television 314c as desired. Other embodiments are possible.

With respect to "Branch B," at step 714, a determination may be made by the television receiver as to whether verification of correct answering of a particular logical question has been received. For example, the PTR 310 may detect that a user has manipulated the cursor 604 within the second user prompt 616 to select the icon associated with the number "8" which represents a verification of correctly answering the question "What is the square root of 64?" as discussed above in connection with FIG. 5. Alternatively, the PTR 310 may detect that a user has manipulated the cursor 604 within the second user prompt 616 to select the icon associated with the number "7," or to select the icon associated with the number "9" which represents a verification of correctly answering the question "What is the square root of 64?" which does not represent a verification of correctly answering the question "What is the square root of 64?"

Flow within the example method 700 may branch to step 716 upon a "Yes" determination at step 714, and may branch to step 718 upon a "No" determination at step 710.

At step 716, the television receiver may provide automatic and instantaneous authorized access to the particular broadcast programming. For example, the PTR 310 may in one embodiment provide automatic and instantaneous authorized access to the "Movie M2," so that the user may access the "Movie M2" for immediate viewing on or by the television 314c, as discussed above in connection with FIG. 5. Other embodiments are possible.

Beginning at step 718, flow within the method 700 may branch in a loop between step 718, step 720, and step 714 where the television receiver may repeatedly output for display different, logical questions (step 718) until a number of allowed questions is exceeded (step 720), at which time process flow with the method 700 may branch to step 712 where the television receiver may output for presentation by a display device an indication that a "correct" answer has not been received, and that authorized access to the particular broadcast programming is denied. For example, at steps the PTR 310 may initially output for display within the second user prompt 616 the question "What is the square root of 64?" where when answered incorrectly the PTR 310 may repeatedly output for display within the second user prompt 616 another, different question where, following a predetermined number of incorrect answers, the PTR 310 may output the "access denied" message 618 within the second user prompt 616 and/or by or on the television 314c. Other embodiments are possible.

Figure 8:
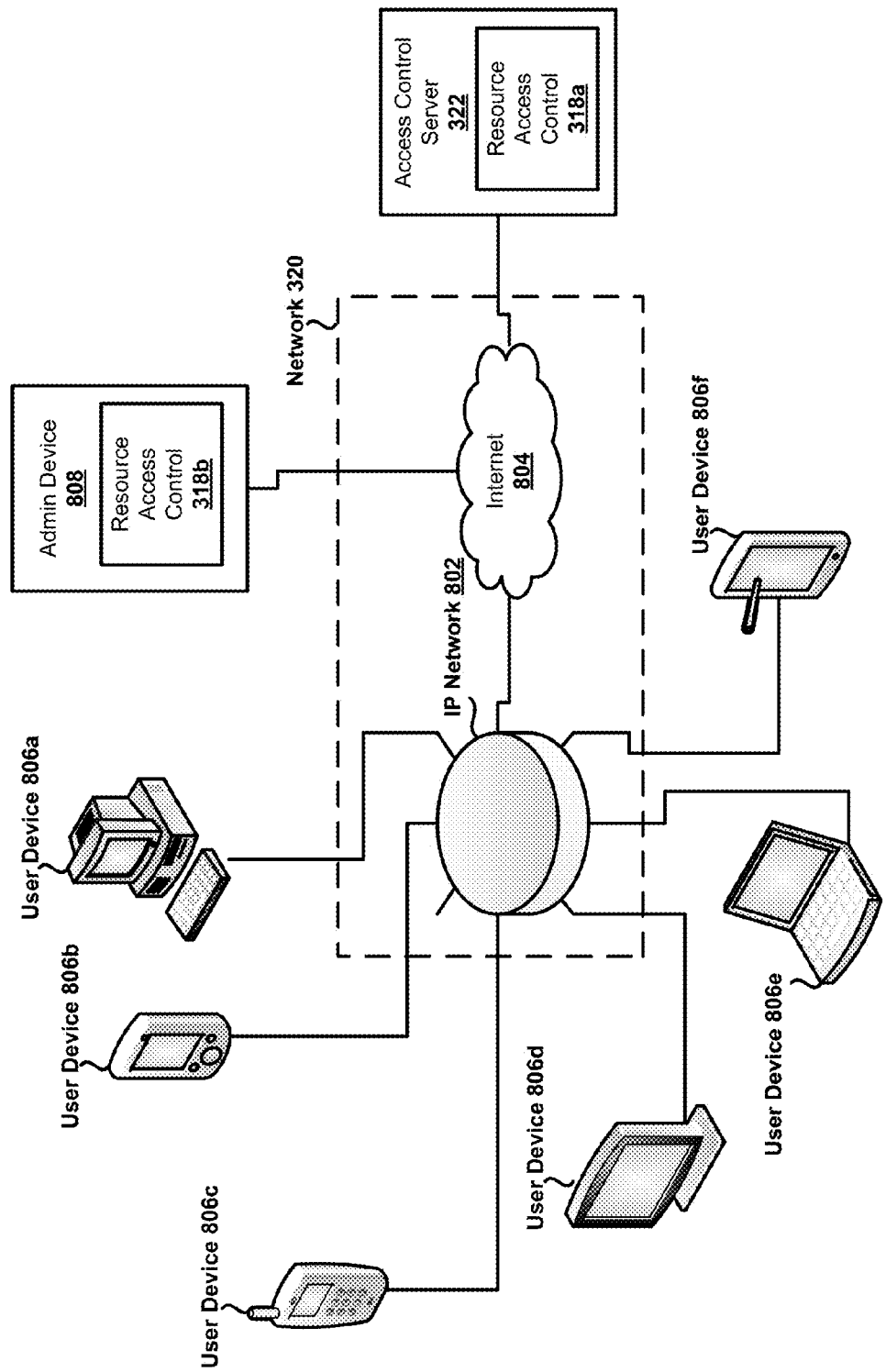
FIG. 8 further shows example aspects of the example system of FIG. 3 in detail.

Referring now to FIG. 8, further aspects of the example system 300 of FIG. 3 are shown in detail. More specifically, FIG. 8 shows the network 320 and the access control server(s) 322 of FIG. 3. In this example, the network 320 is shown comprising an IP network 802 and the Internet 804. The network 320 is shown in this manner in FIG. 8 for purposes of example only. As discussed above in connection with FIG. 3, the network 320 may represent any number of terrestrial and/or non-terrestrial network features or elements as desired, and those features may or may not be implementation specific.

A plurality of computing systems or devices 806a-f are shown connected directly to the IP network 802 in FIG. 8. These devices are intended to represent any type of conceivable computer device that may access or otherwise connect to the IP network 802, which may in one embodiment correspond to a LAN, such as a HAN. For example, the devices 806a-f may include a desktop computer (e.g., device 806a), a personal data assistant (e.g., device 806b), a smartphone (e.g., device 806c), a television receiver (e.g., device 806d), a laptop computer (e.g., device 806e), a tablet computer (e.g., device 806f), and many other different types of computing devices. Further, an administrator device 808 and the access control server 322 of FIG. 3 are shown connected directly to the Internet 804 in FIG. 8. Other embodiments are possible. For example, one or both of the administrator device 808 and the access control server 322 may be connected directly to the IP network 802 in FIG. 8.

Both the administrator device 808 and the access control server 322 may include a particular instance of the RAC module 318 as shown in FIG. 3. In particular, the administrator device 808 may include an RAC module 318b, and the access control server 322 may include an RAC module 318a. The RAC module 318a and the RAC module 318b may be configured substantially the same. However, certain features of the RAC module 318a may be different from the RAC module 318b, and vice versa.

For example, the RAC module 318a of the access control server 322 may be configured to detect connection of a particular computing device to the IP network 802, such as each of the plurality of user computing systems or devices 806a-f. For example, the RAC module 318a may as part of a discovery process detect connection of the device 806c to the IP network 802. In this example, the RAC module 318a may further be configured to determine whether or not a particular file or profile, referred to in one embodiment as a "resource restriction profile," that is associated with the device 806c detected as connecting or connected to the IP network 802 is available. For example, the RAC module 318a may query a repository or database of the access control server 322 to determine whether the device 806c is registered with the access control server 322 to participate in a "Network-Wide Remote Parental Control" implementation according to the present disclosure. Such a feature or process may be implemented in any number of ways.

For example, the device 806c itself may have a unique identification parameter that may be discovered by the RAC module 318a when the device 806c connects to the IP network 802. A particular resource restriction profile when existing may then be matched to the device 806a by the RAC module 318a based on the unique identification parameter. In another example, a user credential such as a username and/or password, for example, that is used by a user to access features and/or functionality of the device 806a may be discovered by the RAC module 318a when the device 806c connects to the IP network 802. A particular resource restriction profile when existing may then be matched to the device 806c by the RAC module 318a based on the a user credential. Many other methods may be used to determine whether or not a particular file or profile that is associated with the device 806c, for example, detected as connecting to the IP network 802 is available.

The RAC module 318a of the access control server 322 may further be configured to send information associated with a particular file or profile to the device 806c when available. For example, the RAC module 318a of the access control server 322 may send to the device 806c an associated particular resource restriction profile, or at least data contained within the associated particular resource restriction profile, where the particular resource restriction profile may in some cases designate at least one resource to be disabled, or at least restrict access to, by the device 806c when that resource is exhibited by the device 806c.

For example, in the context of a parental control or a parental control scenario, the particular resource may be a resource that a parent wishes a child not have immediate access to. Here, the device 806c may have a dedicated interface and/or software module configured to identify the particular resource that a parent wishes a child not have immediate access to, and disable and/or at least prevent or limit immediate access to the particular resource, such as described in further detail below in connection with FIG. 9. It is contemplated that the dedicated interface and/or software module may be configured such that the same has access to resources of the device 806c, both on a hardware level and software level in or at any degree of abstraction as desired. For example, the dedicated interface and/or software module may interact directly with an operating system of the device 806c. In another example, the dedicated interface and/or software module may sit above the operating system and interact directly with an executing mobile application of the device 806c. Still other examples are possible as well.

Further, the particular resource may be any type of hardware or software resource of the device 806c. For example, the particular resource may be a communications resource (e.g., texting, email, phone, etc.) that a parent wishes a child not have immediate access to. In another example, the particular resource may be a software or mobile application resource (e.g., Angry Birds, Internet browser, iTunes, etc.) that a parent wishes a child not have immediate access to. In still another example, the particular resource may be a specific social media resource (e.g., Facebook, Twitter, Snapchat, etc.) that a parent wishes a child not have immediate access to. Still other examples are possible.

Continuing with the present example, the RAC module 318 of the access control server 322 may further be configured to send to the administrator device 808 a notification indicating that a particular file or profile that is associated with the device 806c detected as connecting or connected to the IP network 802 is not available. An administrator may use the notification then to proceed with registering the device 806c with the access control server 322 to participate in a "Network-Wide Remote Parental Control" implementation according to the present disclosure. For instance, the notification may inform a parent that the device 806c of the above-example scenario, which may be assumed to be used or owned by a child in this example, has not yet been is registered with the computing system or device to participate in a "Network-Wide Remote Parental Control" implementation according to the present disclosure. The parent may then proceed to define a particular file or profile that is associated with the device 806c accordingly.

Figure 9:
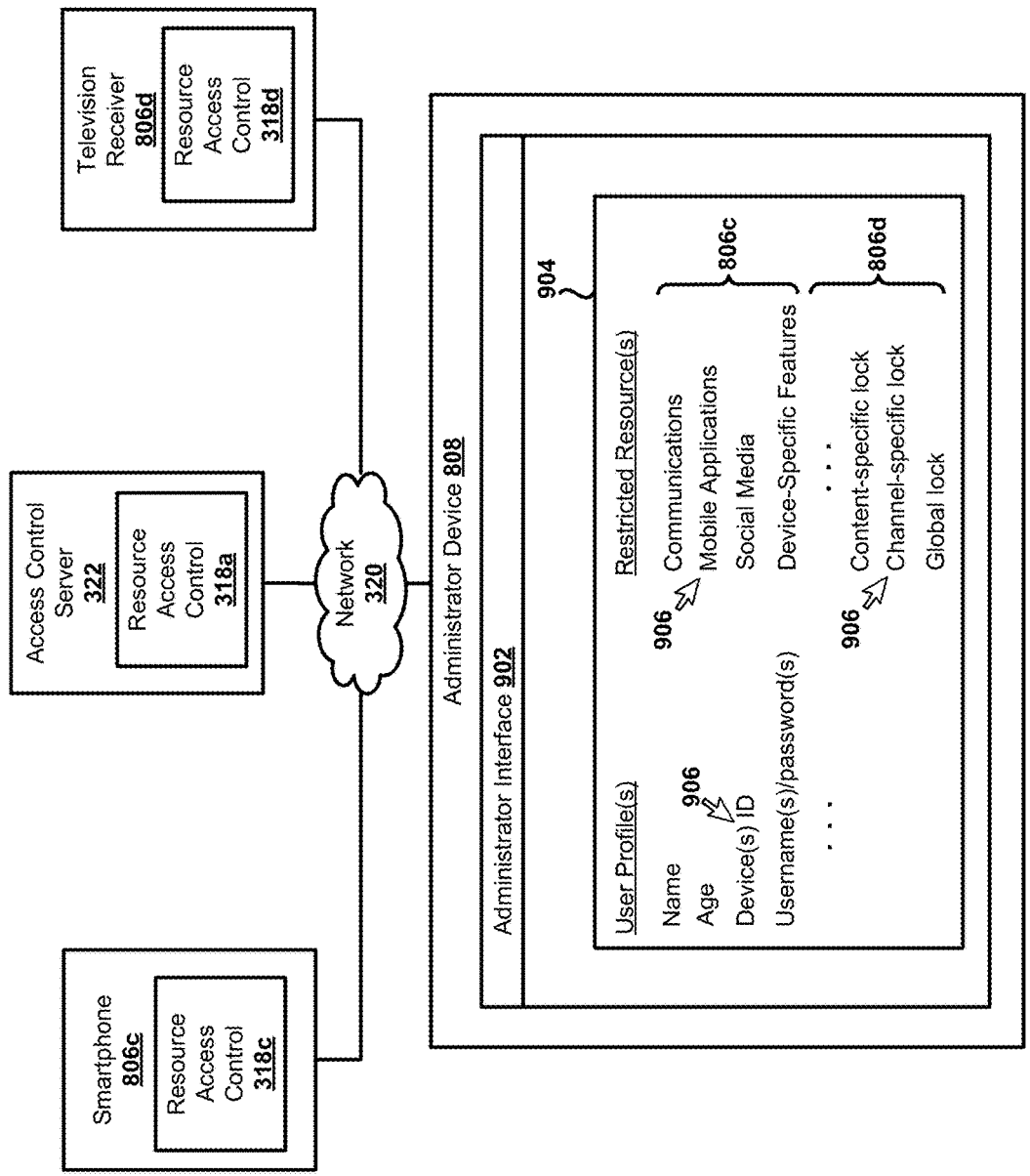
FIG. 9 shows example aspects of the example system of FIG. 8 in detail.

For example, referring now additionally to FIG. 9, aspects of the example system of FIG. 8 are shown in detail. More specifically, FIG. 9 shows the device 806c, the device 806d, the administrator device 808, and the access control server 322 of FIG. 8. In practice, the RAC module 318b of the administrator device 808 may be configured to output an administrator interface 902 to and for presentation by at least the administrator device 808. The administrator interface 902 may enable an administrator to configure and/or manage aspects of the various parental control concepts of the present disclosure. For example, in one embodiment, the administrator interface 902 may enable an administrator to define a resource restriction profile 904 that may be associated with the device 806c and the device 806d. The profile 904 may in some cases designate at least one resource to be disabled, or at least restrict access to, by the device 806c and the device 806d when that resource is exhibited by the device 806c and/or the device 806d and the same are connected to the IP Network 802. Other embodiments are possible. For example, the administrator interface 902 may enable an administrator to define a resource restriction profile that may be associated with one or more of any of the plurality computing systems or devices 806a-f, or any computing systems or devices, that may be connected to the IP network 802 as shown in FIG. 8.

For example, an administrator may manipulate a cursor 906 to select and/or define various information within the profile 904 so that the device 806c and the device 806d may disable, or at least restrict access to, particular hardware and/or software resources exhibited by the device 806c and/or the device 806d when connected to the IP network 802. For example, an administrator may manipulate the cursor 906 to select and/or define one or more communications resources (e.g., texting, email, phone, etc.), one or more software or mobile application resources (e.g., Angry Birds, Internet browser, iTunes, etc.), one or more specific social media resources (e.g., Facebook, Twitter, Snapchat, etc.), one or more device-specific resources (e.g., camera, video recorder, notification or alert disable, etc.), and many others that the administrator may wish that a user of the device 806c not have immediate access to when connected to the IP network 802. In another example, an administrator may manipulate the cursor 906 to select and/or define resources that the administrator may wish that a user of the device 806d not have immediate access to when connected to the IP network 802.

For example, an administrator may manipulate the cursor 906 to select and/or define at least one of a "content-specific" parental control lock that may prevent unauthorized viewing of a particular show received by the device 806d, a "channel-specific" parental control lock that may prevent unauthorized viewing of any program associated with a particular broadcast or network channel received by the device 806d, and a "global" parental control lock that may prevent unauthorized viewing of all broadcast programming received by the device 806d at any particular time when the global lock is "enabled" and the when the device 806d is connected to the IP network 802. Other embodiments are possible. For example, such a procedure may be performed as desired for any one of the plurality computing systems or devices 806a-f, or any computing systems or devices, that may be connected to the IP network 802 as shown in FIG. 8.

Further, an administrator may manipulate the cursor 906 to select and/or define at least one user "Name," at least one user "Age," at least one device "ID," and/or at least one user credential "Username/password," within the profile 904 so that the RAC module 318a of the access control server 322 may, for example, determine whether or not a particular resource restriction profile (e.g., profile 904) that is associated with the device 806c and/or the device 806d detected as connecting or connected to the IP network 802 is available.

When such as match is made, the access control server 322 may send to the device 806c and/or the device 806d of the above-example the profile 904, or at least data contained within the profile 904, so that the device 806c and/or the device 806d may disable or at least restrict access to any resource specified within the profile 904.

Figure 10:
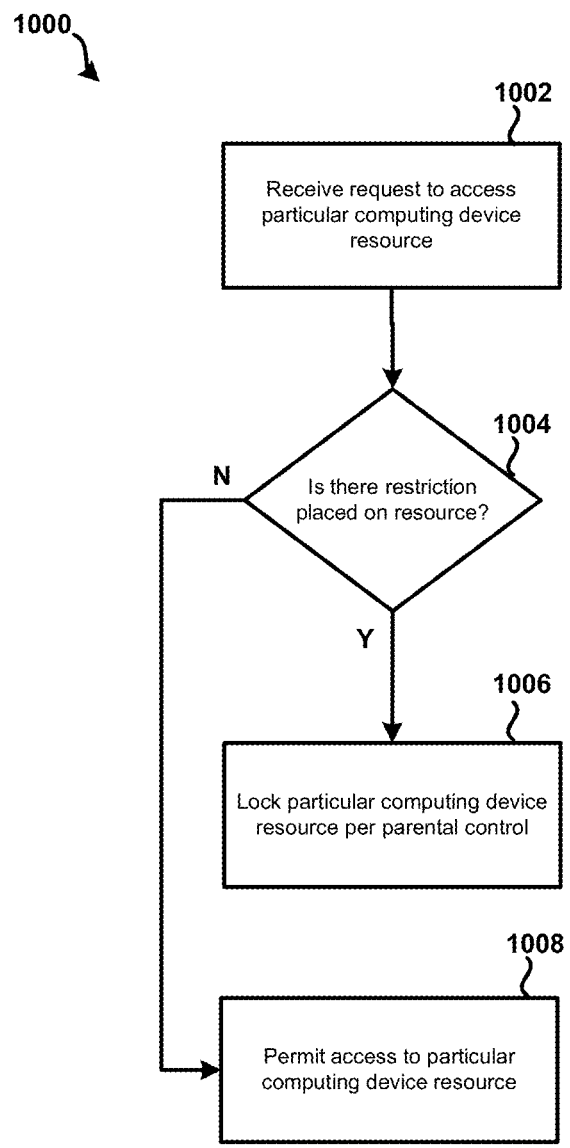
FIG. 10 shows a fourth example method in accordance with the present disclosure.

For example, referring now to FIG. 10, a fourth example method 1000 is shown in accordance with the present disclosure. In general, steps or modules of the method 1000 as described may ultimately be implemented by or on a particular computing device connected to a particular network, such as the device 806c or the device 806d as discussed above in connection with at least FIG. 9. Other embodiments are however possible. For example, one or more modules or steps of the method 1000 may be implemented by or on one or more of the other respective devices or components within the system as described above in connection with at least FIG. 3 and FIG. 9. Still other embodiments are possible.

At step 1002, a request may be received by or at a particular computing device to access a particular resource. For example, a user of the device 806c of FIG. 9 may attempt to access an instance of the game "Angry Birds" installed thereon by "tapping" a multi-touch screen of the device 806c. In this example, the RAC module 318c of the device 806c may detect the attempted access of the game "Angry Birds," and at least temporarily prevent instantaneous access. Other embodiments are possible. For example, it is contemplated that any particular instance of the RAC module 318 may be configured so as to detect and at least temporarily prevent instantaneous access to one or more hardware and/or software resources of a particular computing device or system in accordance with the particular implementation of the computing device or system, and thus the RAC module 318 may be configured as desired so as to implement aspects of the parental control features of the present disclosure.

At step 1004, a determination may be made as to whether there is an access restriction placed on the particular resource. For example, the device 806c of FIG. 9 may query a local database and/or the access control server 322 and determine whether or not a particular resource restriction profile that is associated with the device 806c is available. Here, assuming that a particular resource restriction profile is available on the device 806c, the access control server 322 may be configured to periodically or at least intermittently transfer a "most recent" version of the particular resource restriction profile so that the device 806c may have up-to-date configuration information regarding resources that are intended to be restricted in terms of immediate access. Additionally or alternatively, the device 806c may be configured to first query the access control server 322 when a network connection is available so that the device 806c may have up-to-date configuration information. Other embodiments are possible as well.

Flow within the example method 1000 may branch to step 1006 upon a "Yes" determination at step 1004, and may branch to step 1008 upon a "No" determination at step 1004. In particular, at step 1006, the particular computing device may prevent access to the particular resource, and at step 1008 the particular computing device may allow access to the particular resource. For example, keeping with the above-example, the device 806c of FIG. 9 may prevent access to the game "Angry Birds" installed thereon at step 1006, and may allow access to the to the game "Angry Birds" installed thereon at step 1008.

Figure 11:
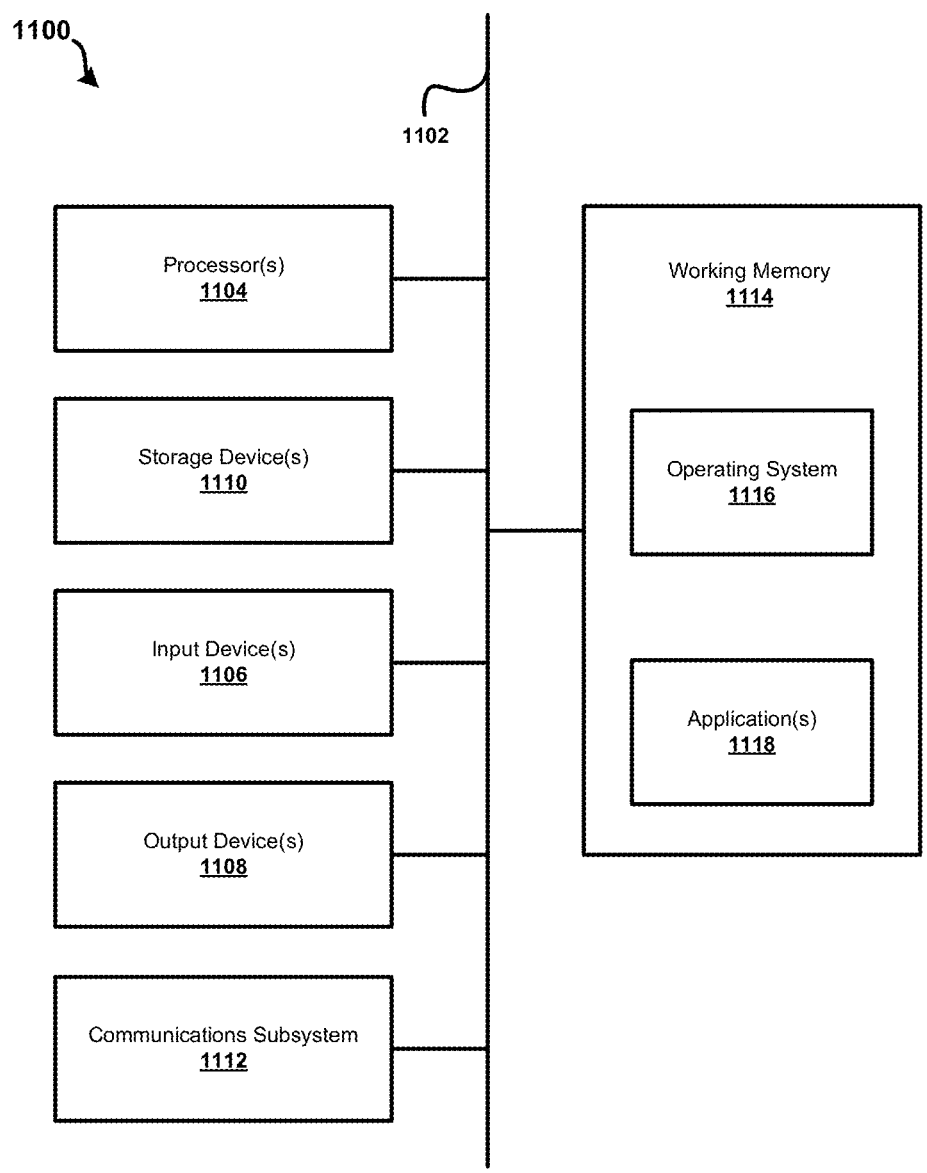
FIG. 11 shows an example computing system or device.

FIG. 11 shows an example computer system or device 1100 in accordance with the present disclosure. An example of a computer system or device includes an enterprise server, blade server, desktop computer, laptop computer, tablet computer, personal data assistant, smartphone, feature phone, gaming console, set-top-box, television receiver, and/or any other type of machine configured for performing calculations. The computer system 1100 may be wholly or at least partially incorporated as part of previously-described computing devices, such as the PTR 310, STRs 312a-b, televisions 314a-c, devices 316a-b, access control server(s) 322, devices 806a-f, and device 808 as described above. The example computer device 1100 may be configured to perform and/or include instructions that, when executed, cause the computer system 1100 to perform the method of FIG. 1, FIG. 2, FIG. 7, and FIG. 10. Further, the example computer device 1100 may be configured to perform and/or include instructions that, when executed, cause the computer system 1100 to instantiate and implement functionality of the RAC module 318 described above.

The computer device 1100 is shown comprising hardware elements that may be electrically coupled via a bus 1102 (or may otherwise be in communication, as appropriate). The hardware elements may include a processing unit with one or more processors 1104, including without limitation one or more general-purpose processors and/or one or more special-purpose processors (such as digital signal processing chips, graphics acceleration processors, and/or the like); one or more input devices 1106, which can include without limitation a remote control, a mouse, a keyboard, and/or the like; and one or more output devices 1108, which can include without limitation a presentation device (e.g., television), a printer, and/or the like.

The computer system 1100 may further include (and/or be in communication with) one or more non-transitory storage devices 1110, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 1100 might also include a communications subsystem 1112, which can include without limitation a modem, a network card (wireless or wired), an infrared communication device, a wireless communication device, and/or a chipset (such as a Bluetooth™ device, an 1102.11 device, a WiFi device, a WiMax device, cellular communication facilities (e.g., GSM, WCDMA, LTE, etc.), and/or the like. The communications subsystem 1112 may permit data to be exchanged with a network (such as the network described below, to name one example), other computer systems, and/or any other devices described herein. In many embodiments, the computer system 1100 will further comprise a working memory 1114, which may include a random access memory and/or a read-only memory device, as described above.

The computer device 1100 also can comprise software elements, shown as being currently located within the working memory 1114, including an operating system 1116, device drivers, executable libraries, and/or other code, such as one or more application programs 1118, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1110 described above. In some cases, the storage medium might be incorporated within a computer system, such as computer system 1100. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1100) to perform methods in accordance with various embodiments of the invention. According to a set of embodiments, some or all of the procedures of such methods are performed by the computer system 1100 in response to processor 1104 executing one or more sequences of one or more instructions (which might be incorporated into the operating system 1116 and/or other code, such as an application program 1118) contained in the working memory 1114. Such instructions may be read into the working memory 1114 from another computer-readable medium, such as one or more of the storage device(s) 1110. Merely by way of example, execution of the sequences of instructions contained in the working memory 1114 may cause the processor(s) 1104 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 1100, various computer-readable media might be involved in providing instructions/code to processor(s) 1104 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1110. Volatile media may include, without limitation, dynamic memory, such as the working memory 1114.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1104 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1112 (and/or components thereof) generally will receive signals, and the bus 1102 then might carry the signals (and/or the data, instructions, etc. carried by the signals) to the working memory 1114, from which the processor(s) 1104 retrieves and executes the instructions. The instructions received by the working memory 1114 may optionally be stored on a non-transitory storage device 1110 either before or after execution by the processor(s) 1104.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving by the television receiver a request to access the particular broadcast programming;
   determining, by a resource access control (RAC) module of the television receiver, a first system user associated with the request to access the particular broadcast programming, the RAC module having previously received one or more parameters characterizing the first system user, and having previously received an instruction, from a computing system other than the television receiver, for the television receiver to prevent unauthorized access to particular broadcast programming by the first system user in accordance with a programming lock mode;
   automatically selecting, by the RAC module of the television receiver, a particular access question from a plurality of access questions in an access question data store based on the one or more parameters characterizing the first system user, so as to control access to the particular broadcast programming, the particular access question having multiple user response options;
   outputting, by the television receiver for presentation by a display device, an interactive user interface including the particular access question to be asked;
   receiving, by the television receiver, a selection of one of the user response options associated with the particular access question, via the interactive user interface; and
   controlling access, by the television receiver, to the particular broadcast programming based on the selected user response option.

2. The method of claim 1, wherein selecting the particular access question to be asked to control access to the particular broadcast programming comprises:
   determining that a particular question mode is associated with the first system user, wherein the particular question mode corresponds to a question mode that prompts the first system user to correctly solve a logical problem.

3. The method of claim 1, wherein selecting the particular access question to be asked to control access to the particular broadcast programming comprises:
   determining that a particular question mode is associated with the first system user, wherein the particular question mode corresponds to a question mode that prompts the first system user to confirm completion of a particular physical task.

4. The method of claim 1, wherein the received programming lock mode corresponds to one of: a channel-specific programming lock mode that restricts access to broadcast programming associated with a particular broadcast channel or station; a content-specific programming lock mode that restricts access to broadcast programming associated with a particular broadcast program; and a global programming lock mode that restricts access to all broadcast programming received at the television receiver.

5. The method of claim 1, wherein the RAC module has, stored therein, a system configuration file to store the previously received one or more parameters characterizing the first system user, and the particular access question comprises a logical problem that is automatically selected based on the one or more parameters associated with the first system user contained within the system configuration file.

6. The method of claim 1, wherein the RAC module has, stored therein, a system configuration file to store the previously received one or more parameters characterizing the first system user, and the particular access question comprises a confirmation of a completion of a particular task automatically selected based on the one or more parameters associated with the first system user contained within the system configuration file.

7. The method of claim 1, further comprising:
   receiving input that specifies a custom message to be presented within the interactive user interface; and
   outputting within the interactive user interface a prompt that prompts the first system user to confirm completion of a particular task as specified by the custom message.

8. A television receiver, comprising:
   one or more processors; and
   a memory communicatively coupled with and readable by the one or more processors and having stored therein processor-readable instructions which, when executed by the one or more processors, cause the one or more processors to:
      receive a request to access the particular broadcast programming;
      determine, by a resource access control (RAC) module, a first system user associated with the request to access the particular broadcast programming, the RAC module having previously received one or more parameters characterizing the first system user, and having previously received an instruction to prevent unauthorized access to particular broadcast programming by the first system user in accordance with a programming lock mode;
      automatically selecting, by the RAC module, a particular access question from a plurality of access questions in an access question data store based on the one or more parameters characterizing the first system user, so as to control access to the particular broadcast programming, the particular access question having multiple user response options;
      output for presentation by a display device, an interactive user interface including the particular access question to be asked;
      receive a selection of one of the user response options associated with the particular access question, via the interactive user interface; and
      control access to the particular broadcast programming based on the selected user response option.

9. The television receiver of claim 8, wherein automatically selecting the particular access question comprises:
   determining that a particular question mode is associated with the first system user, wherein the particular question mode corresponds to a question mode that prompts the first system user to correctly solve a logical problem.

10. The television receiver of claim 8, wherein automatically selecting the particular access question comprises:

determining that a particular question mode is associated with the first system user, wherein the particular question mode corresponds to a question mode that prompts the first system user to confirm completion of a particular task.

11. The television receiver of claim 9, wherein the memory having stored therein processor-readable instructions which, when executed by the one or more processors, cause the one or more processors to: enable authorized access to the particular broadcast programming in response to verifying correct solving of the logical problem.

12. The television receiver of claim 10, wherein the memory having stored therein processor-readable instructions which, when executed by the one or more processors, cause the one or more processors to: output for presentation by the display device a particular alphanumeric password in response to confirming completion of the particular task by the first system user; receive an indication of entry of the alphanumeric password within a text field of the interactive user interface; and enable authorized access to the particular broadcast programming, in response to receiving the indication of the entry of the alphanumeric password into the interactive user interface.

13. The television receiver of claim 8, wherein the RAC module has, stored therein, a system configuration file to store the previously received one or more parameters characterizing the first system user, and the particular access question comprises a logical problem that is selected based on the one or more parameters associated with the first system user contained within the system configuration file.

14. The television receiver of claim 8, wherein the RAC module has, stored therein, a system configuration file to store the previously received one or more parameters characterizing the first system user, and the particular access question comprises a confirmation of a completion of a particular task selected based on the one or more parameters associated with the first system user contained within the system configuration file.

15. A non-transitory processor-readable medium comprising processor-readable instructions configured to cause one or more processors to:
receive a request to access the particular broadcast programming;
determine, by a resource access control (RAC) module, a first system user associated with the request to access the particular broadcast programming, the RAC module having previously received one or more parameters characterizing the first system user, and having previously received an instruction to prevent unauthorized access to particular broadcast programming by the first system user in accordance with a programming lock mode;
automatically select, by the RAC module, a particular access question from a plurality of access questions in an access question data store based on the one or more parameters characterizing the first system user, so as to control access to the particular broadcast programming, the particular access question having multiple user response options;
output for presentation by a display device, an interactive user interface including the particular access question to be asked;
receive a selection of one of the user response options associated with the particular access question, via the interactive user interface; and
control access to the particular broadcast programming based on the selected user response option.

16. The method of claim 1, wherein the request to access the particular broadcast programming is received from the display device, and wherein the first system user is determined by retrieving a previous association between the display device and the first system user.

17. The method of claim 1, wherein automatically selecting the particular access question comprises:
automatically selecting the particular access question based further on at least one of the particular broadcast programming, or the display device.

18. The television receiver of claim 8, wherein automatically selecting the particular access question comprises:
automatically selecting the particular access question based further on at least one of the particular broadcast programming, or the display device.

19. The method of claim 1, further comprising:
outputting via the interactive user interface a prompt that prompts the first system user to upload an image of completion of a particular task to confirm completion of the particular task;
receiving an upload of the image;
communicating the image to an administrator user; and
receiving, by the television receiver, an indication from the administrator permitting access by the first system user to the particular broadcast programming via the television receiver.

20. The method of claim 1, wherein the processor-readable instructions, when executed by the one or more processors, cause the one or more processors further to:
output via the interactive user interface a prompt that prompts the first system user to upload an image of completion of a particular task to confirm completion of the particular task;
receive an upload of the image;
communicate the image to an administrator user; and
receive, by the television receiver, an indication from the administrator permitting access by the first system user to the particular broadcast programming via the television receiver.

* * * * *